United States Patent
Luciano, Jr.

(10) Patent No.: US 9,763,392 B2
(45) Date of Patent: Sep. 19, 2017

(54) HEATED SPRAY SYSTEM FOR FROST PROTECTION

(71) Applicant: Robert A. Luciano, Jr., Reno, NV (US)

(72) Inventor: Robert A. Luciano, Jr., Reno, NV (US)

(73) Assignee: EDGE TECHNOLOGY, Reno, NV (US)

( * ) Notice: Subject to any disclaimer, the term of this patent is extended or adjusted under 35 U.S.C. 154(b) by 129 days.

(21) Appl. No.: 13/671,781

(22) Filed: Nov. 8, 2012

(65) Prior Publication Data

US 2013/0160357 A1    Jun. 27, 2013

Related U.S. Application Data

(63) Continuation-in-part of application No. 13/081,984, filed on Apr. 7, 2011, now Pat. No. 8,678,706, and a continuation-in-part of application No. 13/082,005, filed on Apr. 7, 2011, and a continuation-in-part of application No. 13/082,017, filed on Apr. 7, 2011.

(60) Provisional application No. 61/322,739, filed on Apr. 9, 2010, provisional application No. 61/322,761, filed on Apr. 9, 2010, provisional application No. 61/322,773, filed on Apr. 9, 2010.

(51) Int. Cl.
*A01G 13/06* (2006.01)
*A01G 17/06* (2006.01)
*A01G 13/02* (2006.01)

(52) U.S. Cl.
CPC ........ *A01G 13/065* (2013.01); *A01G 13/0206* (2013.01); *A01G 17/06* (2013.01)

(58) Field of Classification Search
CPC ........ A01G 9/12; A01G 13/065; A01G 17/06; A01G 25/02; A01G 25/16
USPC .................... 47/48.5, 21.1, 70, 79
See application file for complete search history.

(56) References Cited

U.S. PATENT DOCUMENTS

| | | |
|---|---|---|
| 661,898 A | 11/1900 | Tucker |
| 1,688,802 A | 10/1928 | Crowhurst |
| 1,758,941 A | 5/1930 | Gibson |

(Continued)

FOREIGN PATENT DOCUMENTS

JP    0195710 A  *  4/1989  ............. A01G 17/02

OTHER PUBLICATIONS

Alzorgan, Mohammad, An Automated System for Irrigation and Frost Protection, Journal of Ubiquitous Systems and Pervasive Networks, (2011) vol. 3, No. 1, pp. 13-17.

*Primary Examiner* — David Parsley
*Assistant Examiner* — Danielle Clerkley
(74) *Attorney, Agent, or Firm* — Kerr IP Group, LLC

(57) ABSTRACT

A heated spray system for frost protection and prevention is described. Heated water, such as groundwater, is delivered through a spray system to the area surrounding the irrigated crops, thus increasing the temperature near the crops and preventing frost damage. Surface water is provided, by a drip irrigation line. The crops are protected from excessive irrigation with the addition of protective covers, a protective curtain, and a drainage system. When spraying groundwater for temperature control, the covers, curtain, and drainage system prevent the water from reaching the roots of the crops, and thus prevent the groundwater from damaging the roots due to contaminants and pollutants in the groundwater.

20 Claims, 21 Drawing Sheets

(56) References Cited

U.S. PATENT DOCUMENTS

| | | |
|---|---|---|
| 1,846,395 A | 2/1932 | Huffaker |
| 3,274,769 A | 9/1966 | Reynolds |
| 3,470,943 A | 10/1969 | Van Huisen |
| 3,604,728 A | 9/1971 | Blass et al. |
| 3,755,961 A | 9/1973 | McIsaac |
| 3,864,917 A | 2/1975 | Jacoby |
| 3,875,699 A | 4/1975 | Lamarre |
| 3,912,165 A * | 10/1975 | Pira ................ A01G 25/023 137/10 |
| 3,915,384 A | 10/1975 | Diggs |
| 3,998,392 A * | 12/1976 | St. Clair .................... 239/547 |
| 4,015,366 A * | 4/1977 | Hall, III .................... 47/1.43 |
| 4,039,144 A * | 8/1977 | Mee ........................... 239/2.1 |
| 4,052,858 A | 10/1977 | Jeppson |
| 4,085,543 A | 4/1978 | Barnard |
| 4,120,158 A | 10/1978 | Sheinbaum |
| 4,127,164 A | 11/1978 | Erwin |
| 4,325,681 A | 4/1982 | Matthews |
| 4,348,135 A | 9/1982 | Clair |
| 4,437,263 A | 3/1984 | Nir et al. |
| 4,502,288 A * | 3/1985 | Lynch ......................... 62/171 |
| 4,577,435 A | 3/1986 | Springer et al. |
| 4,651,466 A * | 3/1987 | Robinson ..................... 47/19.1 |
| 4,742,643 A | 5/1988 | Thompson, Jr. |
| 4,825,592 A | 5/1989 | Earls |
| 4,988,041 A | 1/1991 | Ducrot |
| 5,160,214 A | 11/1992 | Sakurai et al. |
| 5,267,172 A | 11/1993 | Vermesse |
| 5,287,888 A | 2/1994 | Geiger |
| 5,357,710 A | 10/1994 | Dulik et al. |
| 5,364,439 A | 11/1994 | Gallup et al. |
| 5,479,338 A | 12/1995 | Ericksen et al. |
| 5,634,346 A | 6/1997 | Ramakrishnan et al. |
| 5,634,515 A | 6/1997 | Lambert |
| 5,727,621 A | 3/1998 | Hardin |
| 5,752,341 A | 5/1998 | Goldfarb |
| 5,862,625 A | 1/1999 | Parker |
| 5,881,495 A | 3/1999 | Clark |
| 5,944,444 A | 8/1999 | Motz et al. |
| 6,088,956 A * | 7/2000 | Rocka ............................. 47/45 |
| 6,314,340 B1 | 11/2001 | Mecham et al. |
| 6,393,764 B1 | 5/2002 | Smith |
| 6,726,401 B1 | 4/2004 | Potts |
| 6,947,810 B2 * | 9/2005 | Skinner ....................... 700/283 |
| 7,118,307 B2 | 10/2006 | Stoecker et al. |
| 7,243,459 B2 * | 7/2007 | Kaprielian ................. 47/1.01 R |
| 7,575,047 B2 | 8/2009 | Lackinger et al. |
| 7,645,091 B2 * | 1/2010 | Wallace ........................ 405/36 |
| 7,941,968 B1 | 5/2011 | Coyle |
| 7,992,631 B2 | 8/2011 | Brett |
| 8,096,293 B2 | 1/2012 | Holellenriegel et al. |
| 8,678,706 B2 | 3/2014 | Luciano |
| 8,919,036 B2 | 12/2014 | Luciano |
| 2006/0022066 A1* | 2/2006 | Jerstad .......................... 239/276 |
| 2006/0150497 A1* | 7/2006 | Kaprielian .................... 47/62 R |
| 2009/0060659 A1 | 3/2009 | Wallace |
| 2010/0038052 A1 | 2/2010 | Johnson et al. |
| 2011/0088315 A1* | 4/2011 | Donoghue ............. A01G 25/16 47/48.5 |
| 2011/0247264 A1 | 10/2011 | Luciano |
| 2011/0247704 A1 | 10/2011 | Luciano |
| 2011/0265984 A1 | 11/2011 | Luciano |
| 2011/0284088 A1 | 11/2011 | Mahony |
| 2012/0123817 A1 | 5/2012 | Hohenberger et al. |

\* cited by examiner

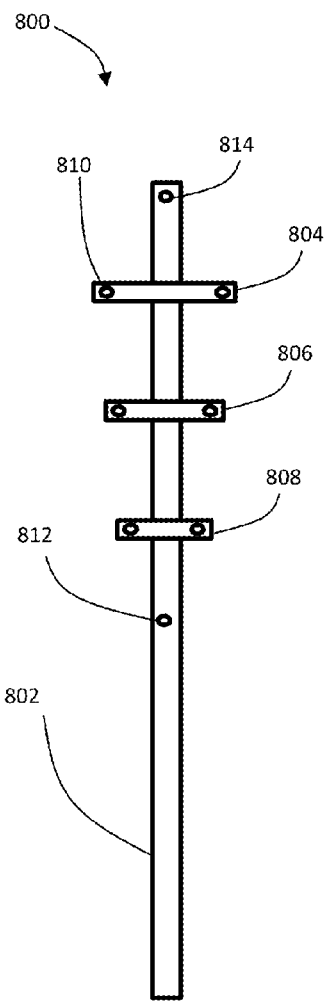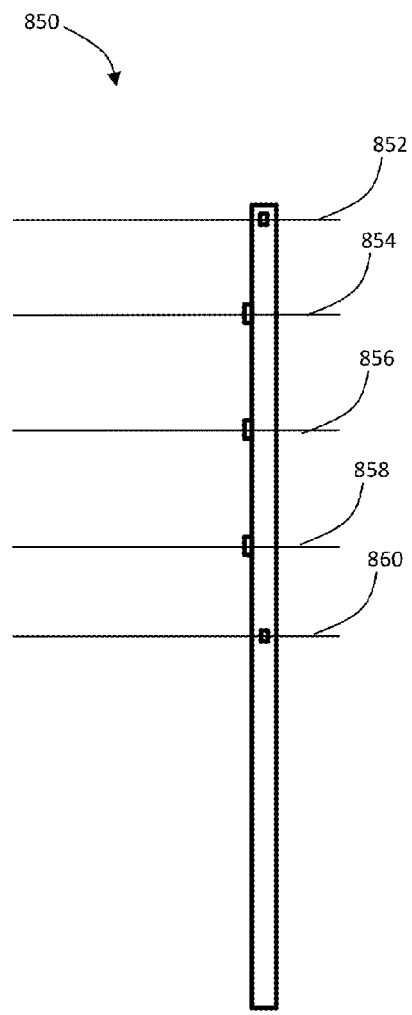
Figure 8A                    Figure 8B

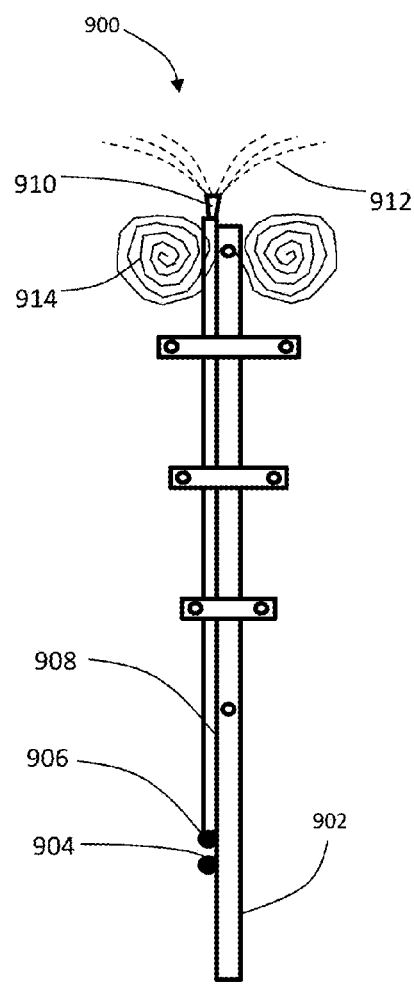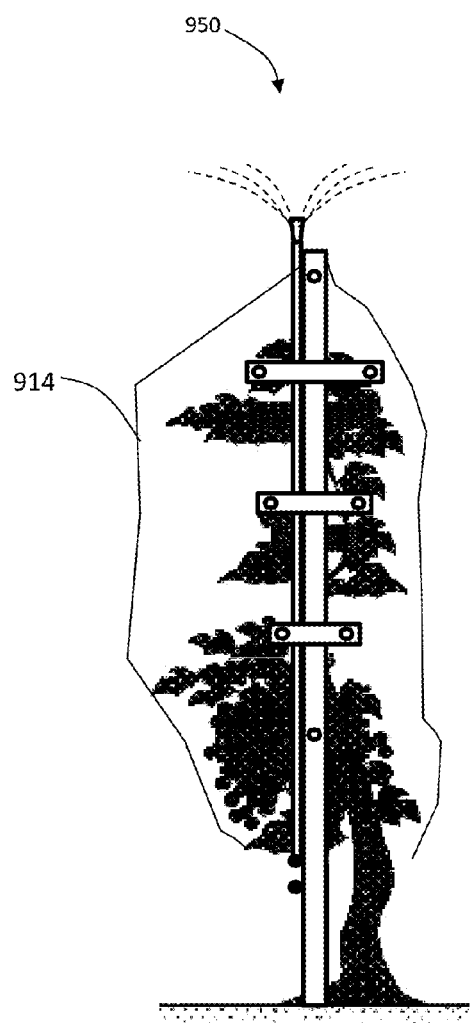
Figure 9A                    Figure 9B

HEATED SPRAY SYSTEM FOR FROST PROTECTION

CROSS REFERENCES

This patent application is a continuation-in-part of U.S. patent application Ser. No. 13/081,984 filed on Apr. 7, 2011; a continuation-in-part of U.S. patent application Ser. No. 13/082,017 filed on Apr. 7, 2011; a continuation-in-part of U.S. patent application Ser. No. 13/082,005 filed on Apr. 7, 2011; wherein the above referenced patent applications claim the benefit of provisional patent application 61/322,739 filed on Apr. 9, 2010; provisional patent application 61/322,761 filed on Apr. 9, 2010; and provisional patent application 61/322,773 filed on Apr. 9, 2010; and wherein all of the above referenced applications are incorporated by reference in their entirety.

FIELD

The invention relates to a system and method for frost protection by spraying heated water in the vicinity of irrigated crops to minimize frost damage. More particularly, the system and method protects the irrigated crops from excessive irrigation with protective structures and drainage elements.

BACKGROUND

Surface water resources are generally more suitable for irrigation than groundwater resources because of the better water quality generally associated with surface waters. Comparatively, hot springs associated with geothermal springs typically include higher concentrations of dissolved solids, salinity, gases, and metals. Thus, heated water from geothermal sources generally contains undesirable contaminants which make the water unsuitable for agricultural irrigation.

Surface water resources are subject to daily, monthly, seasonal and annual changes in temperature. These changes in temperature may result in cold temperature spikes, which may in turn lead to frozen pipes and frozen valves. Additionally, during cold temperature many plants may be damaged or killed by freezing temperatures or frost.

Frost is the solid deposition of water vapor from saturated air; frost is formed when solid surfaces are cooled to below the dew point of the adjacent air. There are many types of frost. Many plants can be damaged or killed by freezing temperatures or frost; and the damage depends on the type of plant and tissue exposed to the low temperatures.

Vines for winemaking also can be affected by cold temperature spikes. For example, frost injury may occur to grapevine tissue and buds. Irrigation with sufficiently warm water during a freeze may provide protection to the plants.

Thus, it would be desirable to have an affordable system for preventing the damage to plants, such as grapevines, exposed to low temperatures and frost.

SUMMARY

A heated spray system for frost protection is described. The heated system includes a trellis, a trellis protective cover, a protective curtain, a drip irrigation line, and a spray nozzle. The trellis is configured to support a plant. The trellis protective cover covers a portion of the plant. The protective curtain shields a portion of the plant and a portion of a ground area surrounding the trellis. The drip irrigation is coupled to the trellis and provides irrigation to the ground area surrounding the trellis. The spray nozzle is coupled to a conduit that receives heated water from a heated water resource. The spray nozzle also generates a mist or spray in a vicinity of the trellis.

The heated spray system may also include a sensor, a pump, and a control system. The sensor determines an ambient temperature near the plant. The pump delivers the heated water to the spray nozzle using the conduit. The control system engages the pump when the sensor indicates the ambient temperature is near freezing. Additionally, the heated spray system may include a drainage system that collects the heated water emanating from the spray nozzle. The drainage system interfaces with the plant soil and drains the heated water away from the plant.

In another illustrative embodiment, the heated water system includes a trellis, a trellis protective cover, a protective curtain, a drip irrigation line, a spray nozzle and a drainage system that collects the heated water emanating from the spray nozzle. The heated spray system may also include a sensor, a first pump, a control system, and an irrigation system. The illustrative irrigation system includes an emitter for delivering surface water to the plant and a second pump that delivers the surface water to the emitter using a second conduit. The illustrative irrigation system engages the second pump according to a predetermined irrigation cycle.

A method for frost protection is also described. The method includes determining an ambient temperature near a plant with a sensor and then engaging a first pump with a control system when the sensor indicates the ambient temperature near the plant is near freezing. The method continues by pumping heated water from a heated water resource to a nozzle that generates a heated spray with the nozzle near the plant. The heated spray provides the plant with frost protection. A protective curtain shields a portion of the plant and a portion of a ground area surrounding the trellis from the heated spray. The water emanating from the nozzle is then collected by a drainage system that drains the collected spray away from the plant.

The illustrative method may also include pumping surface water from a second water source to an emitter that is positioned near the plant and irrigating the plant with the surface water delivered from the emitter. The illustrative method may also include engaging a second pump with a control system according to an irrigation cycle.

In the illustrative embodiments, the heated water source may include geothermal water and heated groundwater. The trellis cover may be configured to be positioned at a top end of the trellis or at a plant trunk level.

FIGURES

The illustrative embodiment will be more fully understood by reference to the following drawings which are for illustrative, not limiting, purposes.

FIG. 8A shows a side elevation of an illustrative agricultural trellis.

FIG. 8B shows a front elevation of an illustrative agricultural trellis.

FIG. 9A shows an illustrative trellis with integrated mounted drip and spray irrigation systems and protective net.

FIG. 9B shows an illustrative trellis with its protective net deployed.

DETAILED DESCRIPTION

Figure 1:
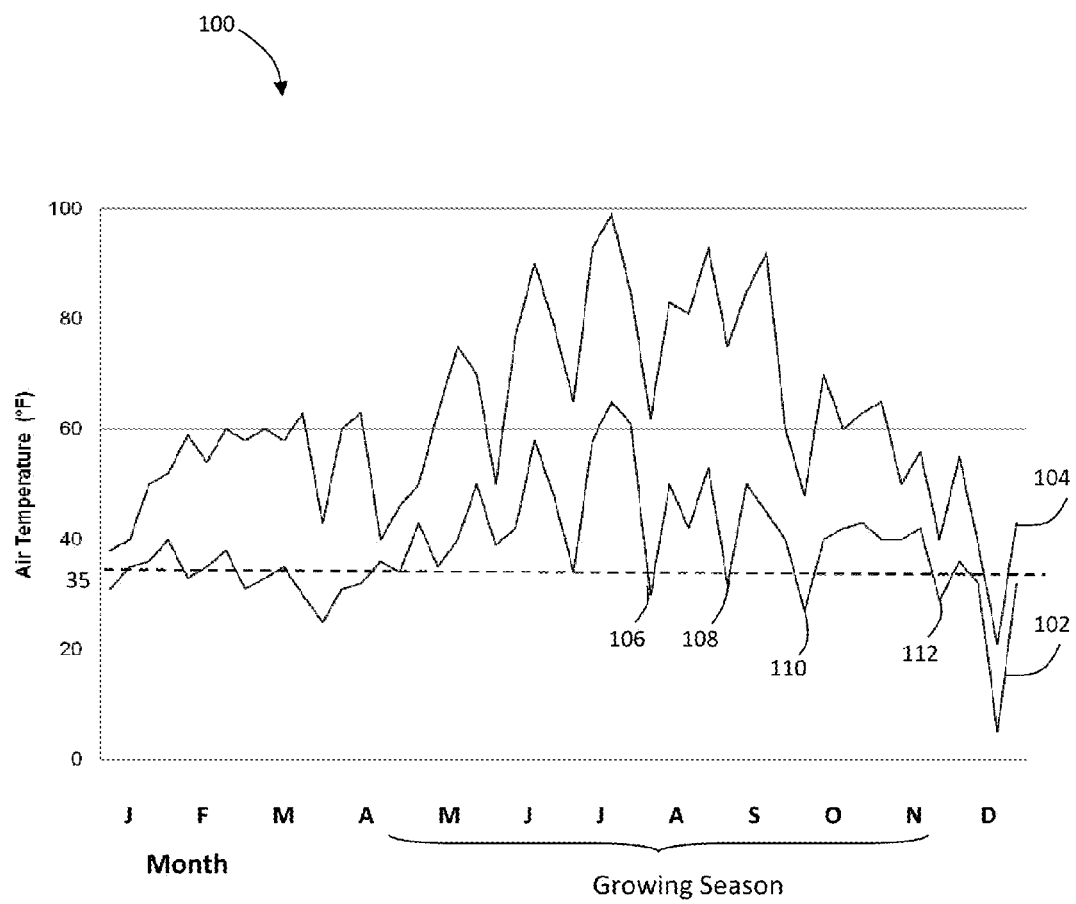
FIG. 1 shows an illustrative graph indicating the low temperature spikes that may occur during the growing season.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the surface water heating system, control systems, and methods described hereinafter may vary as to configuration and as to details.

A system for using heated water, such as groundwater, to prevent frost damage to irrigated crops, such as grapevines, is described. Heated water is delivered through a spray system to the area surrounding the irrigated crops, thus increasing the temperature near the crops and preventing frost damage.

For purposes of this patent, the term "spray irrigation system" and "spray system" will be used interchangeably. The term "spray irrigation system" refers to irrigating the nearby soils with the spray nozzles that are used to increase the temperature near the irrigated crops. The term "spray system" refers more generally to the spraying of water using one or more spray nozzles to increase the temperature near the irrigated crops with little or no irrigation of the nearby soils. In certain instances, it shall be clear that the term "spray system" is emphasizing the heating of the air surrounding the crops affected by heated mist expelled from an illustrative spray nozzle.

The crops are protected from excessive irrigation with the addition of protective covers and a drainage system. When spraying groundwater for temperature control, the covers and drainage system prevent the water from reaching the roots of the crops, and thus prevent the groundwater from damaging the roots due to contaminants and pollutants in the groundwater.

In operation, the spraying of heated water helps control the ambient temperature for the particular crops and plants being grown. The plant covers prevent excessive irrigation and keep the heated water from reaching the roots of the crops and plants. The drainage system drains the sprayed heated water.

In general, an irrigation water heating system is described, in which a geothermal water source is used to heat surface water with a heat exchanger, with the surface heated water delivered to the crops. A heated spray system is also described that delivers a mist or spray of heated water to crops. The spray system includes protective covers and a drainage system used to protect the crops from excessive irrigation and to keep the heated water from reaching the roots of the crops. As described, geothermal or groundwater may be used as the heated water since the protective covers and the drainage system protect the crops from any pollutants or contaminants that may be present in the groundwater. It will be apparent to one skilled in the art that the various embodiments described herein can be combined in various ways, as will be described herein.

Additionally, the terms "geothermal heated fluid," "geothermal water," and "heated water" are used interchangeably. In certain embodiments, the geothermal heated fluid is associated with a liquid phase, a gas phase, and the combination thereof. For example, a hot spring can include a gas phase such as steam, and the liquid phase may be brine, water, or mud.

Referring now to FIG. 1 there is shown an illustrative graph 100 presenting the outside air temperatures during a growing season in a region where the irrigation water heating system may be used. For example, the growing season for a vineyard at a high elevation, such as 5000 feet, may occur between April and November, as indicated in FIG. 1. Exemplary low and high temperatures are indicated by curves 102 and 104, respectively. During the growing season, the low temperature regularly drops below a temperature at which frost on agricultural plants becomes a concern, e.g. 35° F., as indicated at 106-112. The low temperature spikes may present a danger to agricultural plants, such as grapevines, because frost injury may occur to the plants. Irrigation can provide a degree of protection from frost, and the benefit of irrigation during a freeze increases as the temperature of the irrigation water rises.

Figure 2:
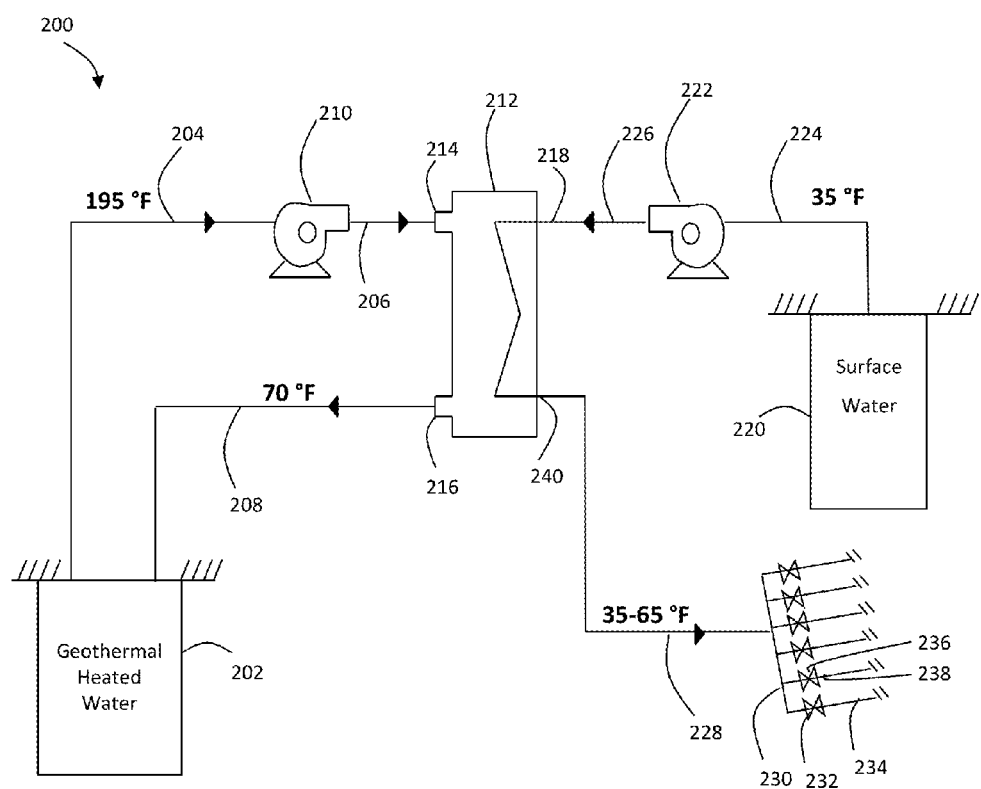
FIG. 2 shows an illustrative irrigation water heating system.

Referring to FIG. 2 there is shown an illustrative irrigation water heating system 200. Geothermal water source 202 includes, for example, a well, hot spring, and other such sources containing geothermal heated fluid. For example, geothermal water is pumped out of the geothermal water source 202 through conduit 204 by geothermal water pump 210. The temperature of the geothermal water is high relative to the temperature of the surface water, e.g. 195° F. Alternatively, the geothermal water may have a temperature of approximately 100° F. The geothermal water is then pumped by pump 210 into a heat exchanger 212. It is to be understood that the temperatures of 195 F and 100 F are used for descriptive purposes, as the geothermal water may be any other warm or hot temperature (without departing from spirit of embodiments) as long as the spraying of the heated water does not damage the plants due to the water being too hot.

A geothermal water conduit system comprised of conduit segments 204, 206, and 208 includes one or more channels along which water flows. By way of example and not limitation, the channel(s) may be composed of pipe or tubing. The conduit may comprise different materials at different segments. For example, conduit segment 204 may be a pipe of steel while conduit segment 208 may be an open channel in the ground composed of plastic or concrete.

Because the conduit segments 204, 206 and 208 and heat exchanger 212 form a loop originating at and returning to geothermal water source 202, the geothermal water conduit system is also referred to as the geothermal loop. The pump, 210, displaces geothermal water along the geothermal water loop.

Heat exchanger 212 is a device that transfers heat from the geothermal heated water stream to the surface water resources, without allowing the geothermal heated water to come into contact with the surface water. In one illustrative embodiment, the heat exchanger may have, for example, a shell and tube design. In a shell and tube heat exchanger, one fluid flows through a shell while the other fluid flows through tubes located within the shell. In a shell and tube heat exchanger, the heat exchanger has a shell-side inlet, where the hot water stream enters the heat exchanger shell; a shell-side outlet, where the hot water stream exits the heat exchanger shell; a tube-side inlet, where the cold water stream enters the heat exchanger tubes; and a tube-side outlet, where water exits the heat exchanger tubes. An illustrative shell and tube heat exchanger is explained further in the description of FIG. 3, below.

Alternatively, the heat exchanger 212 may have, for example, a plate-frame or plate-coil design. Also, in certain embodiments a series of heat exchangers is used to provide the desired amount of heating for the surface water.

In the illustrative embodiment shown in FIG. 2, the geothermal heated water enters the heat exchanger 212 through the shell-side inlet 214 and exits the heat exchanger through the shell-side outlet 216. The geothermal heated water is returned along conduit 208 to the geothermal water source 202. The geothermal heated water in the return path has been cooled in the heat exchanger, for example, to about 70° F.

Surface water is separately pumped by surface water pump 222 from surface water source 220 into the heat exchanger 212 via conduit segments 224 and 226. The surface water enters the heat exchanger 212 through the tube-side inlet 218 and exits the heat exchanger through the tube-side outlet 240. The irrigation water heating system may be engaged, for example, when the surface water has a temperature of about 35° F. The heated surface water is delivered to the irrigation manifold 230 via the conduit segment 228. The heated surface water has been heated within the heat exchanger to a temperature beneficial to preventing frost formation on agricultural plants, for example, about 50° F. At the irrigation manifold 230, the surface water stream is divided into multiple streams to provide irrigation coverage at intervals along the crop area.

In embodiments where the geothermal water has a low enough temperature that will not damage the plants, such as about 100° F., there may be no need for a heat exchanger, and the geothermal water can be pumped directly through a conduit segment to a geothermal irrigation manifold (not shown in FIG. 2) that transfers the geothermal water to the field having the agricultural plants, e.g. vineyard.

The illustrative irrigation manifold 230 transfers water to multiple irrigation channels or rows, each of which may be controlled by a valve such as valve 232. The valve regulates the flow of water through the channel. The valve typically has two states, an open state and a closed state. When the valve is in the open state, water can flow through the valve. When the valve is in the closed state, water is prevented from flowing through the valve.

Each irrigation channel provides irrigation water to a different segment of an agricultural field. The valves are opened and closed such that irrigation water flows to each row serially. Thus, a first valve 232 is opened, and water flows through a first irrigation channel 234. When the desired amount of water has been delivered to the segment served by irrigation channel 234, the first valve 232 is closed, and a second valve 236 is opened to provide irrigation water through a second irrigation channel 238.

As described herein, the irrigation manifold includes irrigation channels for a heated spray system, which provides heated water as mist or spray. The irrigation channels of the heated spray system have valves to control delivery of the heated water to the irrigation channels. The irrigation channels of the heated spray system terminate in an outlet such as a sprinkler nozzle or mister nozzle that disperses the heated water as mist or spray in the vicinity of the plants. The sprinklers or misters may be at ground level or elevated above ground level by a stand, trellis, or other such device that elevates the mister or sprinkler. When sprayed heated water is used to prevent the formation of frost on plants, the plants may receive more water than would typically be applied for irrigation. The excess water may be harmful to the plants. The irrigated area may feature a drainage system to avoid harm to the plants from excess irrigation.

Figure 3:
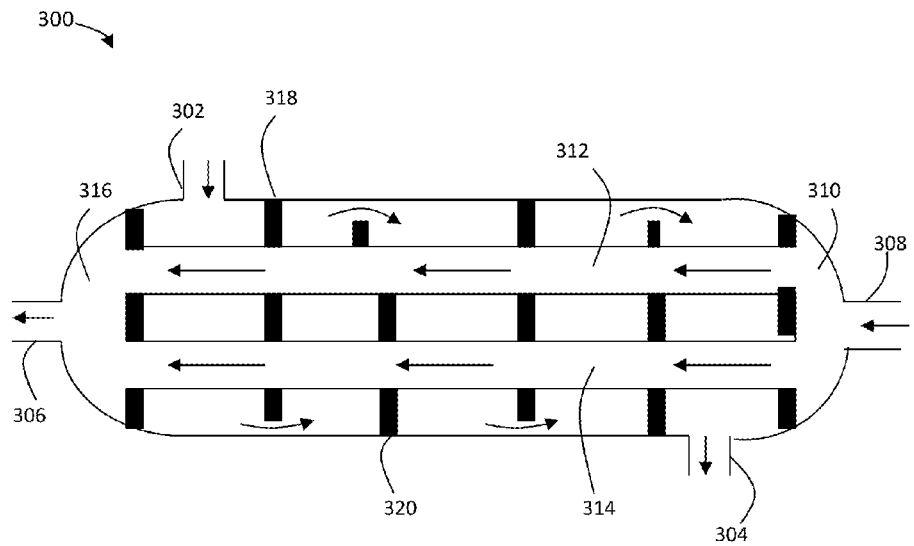
FIG. 3 shows an illustrative heat exchanger for an irrigation water heating system.

Referring to FIG. 3 there is shown an illustrative shell and tube heat exchanger 300. A first fluid enters the shell at shell-side inlet 302 and exits the shell at shell-side outlet 304. A second fluid enters tube inlet plenum 310 at tube-side inlet 308. Tubes 312 and tube 314 branch off of tube plenum 310. The second fluid flows through tubes 312 and 314 in the direction indicated by the arrows. The second fluid flows from the tubes into tube outlet plenum 316 and exits the heat exchanger at tube-side outlet 306. The first and second fluids are shown in a counterflow arrangement with the first fluid flowing in the opposite direction of the second fluid, however, the heat exchanger may be designed with alternative flow configurations, such as a parallel flow configuration.

In the illustrative embodiment, the first geothermal heated fluid may be geothermal water or geothermal gas. The second fluid is surface water. The illustrative surface water may be drawn from a lake, stream, irrigation ditch, or other such surface water source. As the illustrative geothermal heated water and the surface water flow through the heat exchanger, heat from the geothermal water is transferred to the surface water. The heat exchanger is shown with two tubes for illustrative purposes. However, the number of tubes in the heat exchanger will vary depending on the amount of heat transfer required and respective rates of flow of the first and second fluids.

The heat exchanger may include baffles such as baffle 318, which create a tortuous path for fluid flowing through the shell. The first fluid flows under baffle 318 and then over baffle 320, as indicated by the curved arrows. The tortuous route increases the amount of contact between the first fluid and the second fluid which increases the amount of heat exchanged between the fluids. It will be appreciated that various baffle configurations, as well as other methods for creating a tortuous route through the heat exchanger, may be used.

Figure 4:
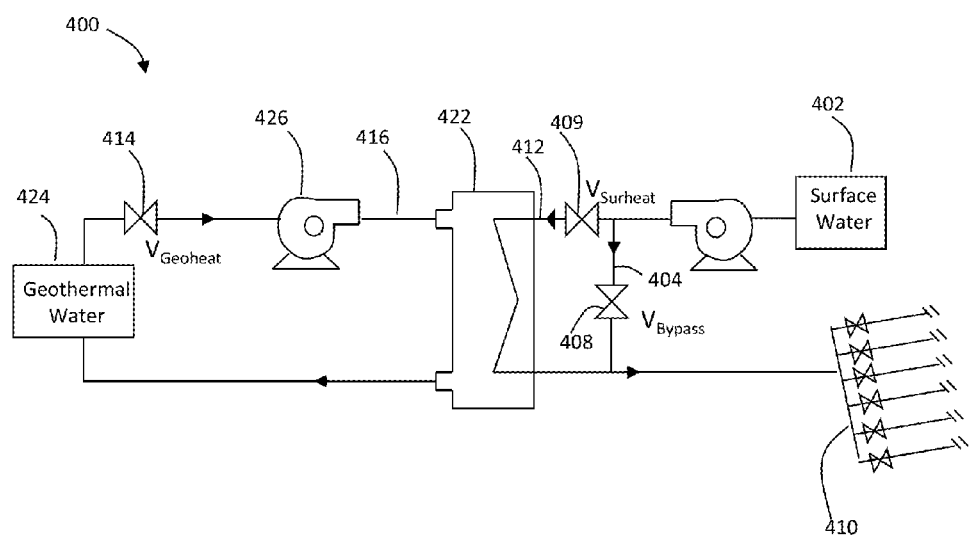
FIG. 4 shows illustrative valves for an irrigation water heating system.
Figure 5A:
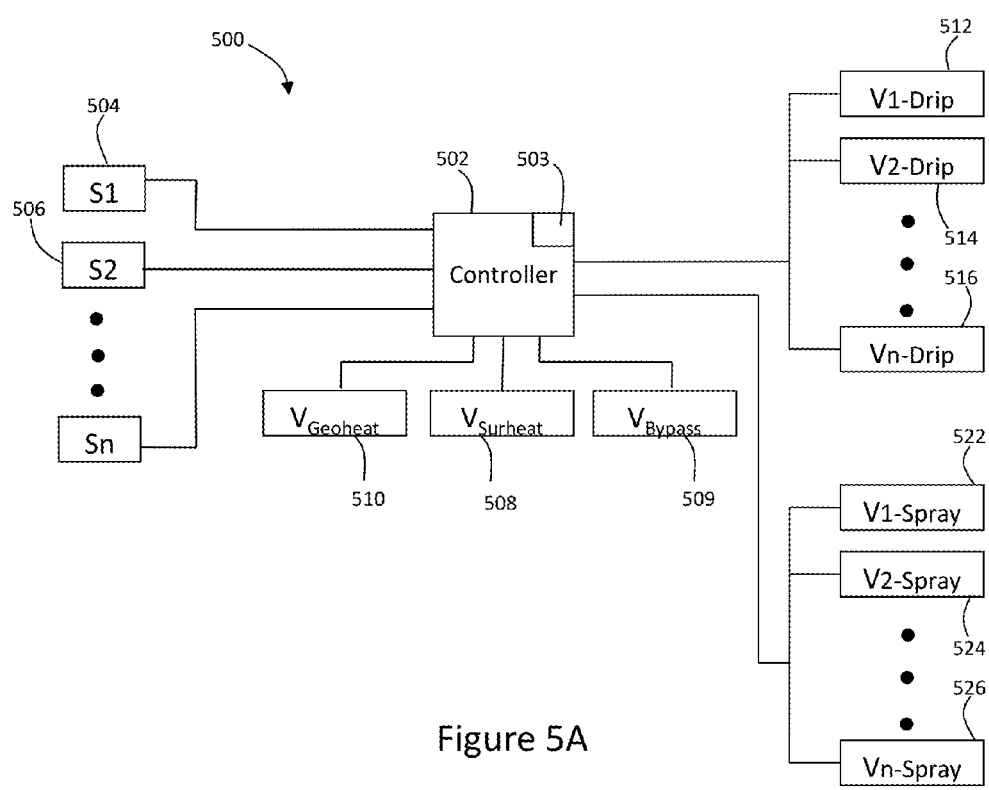
FIG. 5A shows an illustrative control system for the irrigation water heating system of FIG. 4.

Referring to FIGS. 4 and 5A, there are shown illustrative valves associated with the irrigation system 400, in which the valves are controlled by illustrative control system 500. There are three valves 414, 409 and 408 displayed in FIGS. 4 and 5A. The first valve 414 controls the flow of geothermal water from the illustrative heated geothermal water source 424 to the heat exchanger 422. The second valve 409 controls the flow of the surface water to the heat exchanger 422, in which the heated surface water is transferred along conduit 404 and delivered to the irrigation manifold 410. The third valve 408 is a bypass valve that is opened when surface water heating is not utilized, so the surface water flows directly from the surface water source 402 along conduit 404 to irrigation manifold 410. One or more sensors, as shown in FIG. 5A and described in further detail below, trigger the opening and closing of the valves and pumps associated with the irrigation apparatus, systems and methods described herein.

In one embodiment, an illustrative air temperature sensor 504 is an input to the control unit 500. The air temperature data generated by the air temperature sensor 504 may be collected in a buffer in the control unit memory.

Figure 5B:
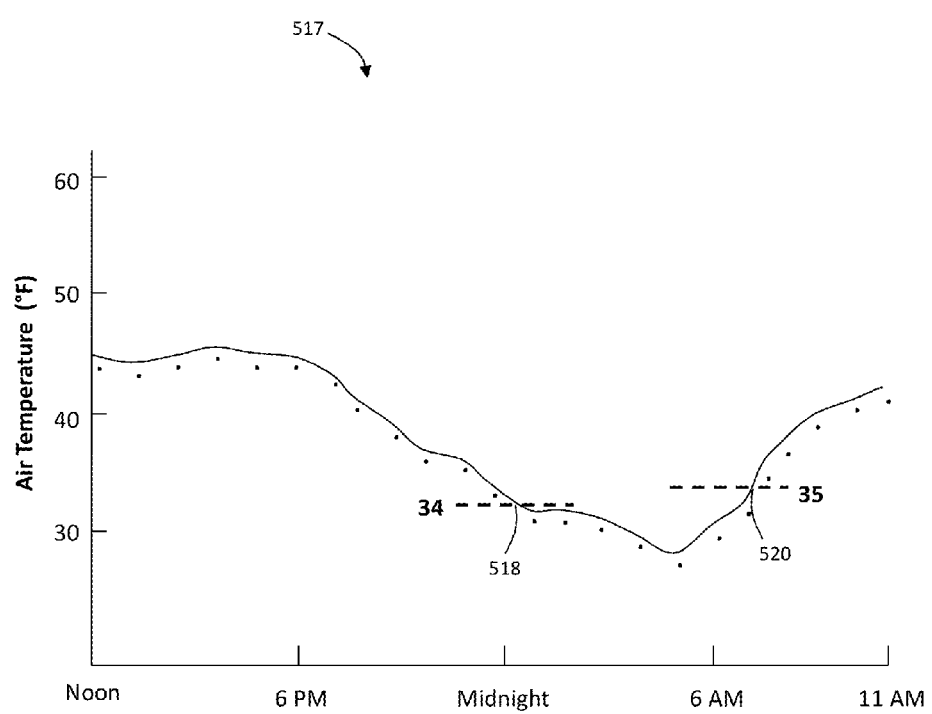
FIG. 5B shows an illustrative graph indicating points at which the irrigation water heating system may be engaged and disengaged relative to air temperature.

For example, if the air temperature drops below a first threshold temperature, e.g. about 34° F., the controller generates an instruction to open valve 414, open valve 409 and close valve 408 and engage the water heating system. Referring to FIG. 5B the air temperature of about 34° F. occurs at intersection 518, and at approximately midnight the surface water heating system is triggered.

In some embodiments, when the air temperature drops below the first threshold temperature, the control unit determines from the air temperature data in the buffer whether the temperature has been falling over a predetermined period of time. If the air temperature has dropped below a first threshold temperature and the temperature has been falling, the controller generates an instruction to engage the water heating system.

In another embodiment, the controller will also determine a rate of change in temperature, which is compared against a threshold rate stored in memory. The rate of change in temperature may be an additional factor used by the controller in the determination of whether the controller will generate an instruction to engage the water heating system.

When the irrigation water heating system is engaged, the following illustrative events take place: the control unit 500 will close valve 408 to shut off the flow of surface water along conduit 404; valve 409 is opened and the water flowing along conduit 404 is rerouted to the heat exchanger 422 via conduit 412; and the control unit will open valve 414 to allow geothermal water to flow from geothermal water source 424 into the heat exchanger 422 via conduit 416. Additionally, geothermal pump 426 may be engaged.

If the air temperature, as measured by the air temperature sensor, rises above a second threshold temperature, for example about 35° F., the control system 500 generates an instruction to disengage the water heating system.

In some embodiments, when the air temperature rises above the second threshold temperature, e.g. about 35° F., the controller determines from air temperature data stored in the buffer whether the air temperature has been rising over a predetermined period of time. If the air temperature is above the second threshold temperature and the controller determines that the temperature has been rising, the controller will generate an instruction to disengage the irrigation water heating system.

When the water heating system is disengaged, geothermal water valve 414 is closed to stop the flow of geothermal water. Additionally, geothermal pump 426 may be disengaged. Heated surface water valve 409 is closed and surface water bypass valve 408 is opened to enable the surface water to flow directly into the irrigation manifold without passing through the heat exchanger.

Referring now to FIG. 5A, the illustrative control system 500 comprises controller 502. An illustrative controller includes a processor, irrigation controller, PID controller, and other such devices that monitor and affect the operation conditions of a given dynamic system. A memory 503 is shown. The memory includes, by way of example and not limitation, RAM, ROM, EPROM, EEPROM, flash memory, L1 Cache, L2 Cache, and other such memory associated with controller 502. The controller receives input from sensor S1 shown at 504. S1 may be, for example, an air temperature sensor. The controller may receive input from additional sensors S2, shown at 506, through Sn.

Controller 502 generates instructions to control the flow of water through the water heating system. The controller may generate an instruction to control the flow of the heated geothermal water 510, typically by generating an instruction to open a valve between the geothermal water source 424 and heat exchanger 422. The controller may generate an instruction to close valve 409 to divert surface water 508 through the heat exchanger so that heated irrigation water is provided to irrigation manifold 410.

The controller also controls the flow of water within the irrigation manifold 410, which comprises irrigation conduits to provide water to drip irrigation systems to each row in an agricultural field, with the flow of water to the irrigation conduits controlled by valves $V_1$-Drip through $V_n$-Drip, as shown at 512-516. The irrigation water may be provided to one irrigation conduit at a time. To provide irrigation water to the irrigation conduits serially, the controller 502 may generate an instruction to open valve $V_1$-Drip. When the desired amount of water has been provided via $V_1$-Drip, the controller generates an instruction to close the valve $V_1$-Drip. Subsequently, the controller generates an instruction to open a valve $V_2$-Drip. When the desired amount of water has been provided via $V_2$-Drip, the controller generates an instruction to close the valve $V_2$-Drip. The controller continues to generate instructions to open and close valves to the irrigation conduits until the row served by $V_n$-Drip has received the desired amount of water. In one embodiment, the controller uses a value stored in memory to determine the amount of water required for each irrigation conduit. The controller 502 may generate instructions to control valves 508-510 and 512-516 such that the drip irrigation system provides heated irrigation water, unheated irrigation water, or no irrigation water.

Irrigation manifold 410 may also provide water to spray irrigation outlets via valves $V_1$-Spray through $V_n$-Spray, as shown at 522-526, which control the flow of water to irrigation conduits serving the rows of an agricultural field. The irrigation conduits of the spray system terminate in nozzles which deliver irrigation as a mist or a spray. The spray system valves may be activated serially, as described above with respect to the drip system valves. The controller 502 may generate instructions to control valves 508-510 and 522-526 such that the spray irrigation system provides heated irrigation water or no irrigation water. The spray irrigation system may provide heated irrigation water independently of, or alternatively, at the same time as the drip irrigation system provides irrigation water to a row in an agricultural field. In one embodiment (not shown), the spray system and the drip system are activated by the same set of valves.

In operation, the first and second threshold temperatures that affect the control system 500 shall vary based on the agricultural plants requiring protection from frost, soil type, soil moisture, air temperature, and other weather conditions.

The frost point temperature is a temperature at which water vapor condenses from the air and deposited as frost. Frost may be damaging to plants as discussed above. The frost point is related to humidity, which is a measure of the amount of water vapor in the air. A sensor for detecting the humidity of the air may be used as an input to the control system. The sensor may be, for example, a capacitive relative humidity sensor.

In some embodiments, the controller may use an alternative sensor in place of the air temperature sensor to determine when the irrigation water heating system is to be engaged and disengaged. For example, the controller may make a determination based on the temperature as measured by a soil temperature sensor. Alternatively, the controller may use more than one sensor input in its determination of when to engage the irrigation water heating system. The controller may use input from at least one of an air temperature sensor, a humidity sensor, a barometric pressure sensor, a soil temperature sensor, a soil moisture sensor, and a wind velocity sensor to make the determination. It will be recognized that additional sensor types may be used as an input that the controller will use in a determination of when to engage and disengage the irrigation water heating system.

The temperature sensor measures the temperature of its surroundings and outputs a signal corresponding to the measured temperature. The measurement may be taken with, for example, a thermistor. The control system uses at least one temperature signal to determine when to engage and disengage the irrigation water heating system.

Moist soil is comparatively more able to retain heat and provide protection to plants against cold weather than a drier soil. Accordingly, a sensor for detecting the moisture of the soil may be used as an input to the control system. The soil moisture sensor determines the amount of moisture in the soil, for example, by measuring the volumetric water content of the soil, and outputs a signal corresponding to the measured moisture level. The soil moisture sensor may use, for example, a frequency domain reflectography approach in which radio frequency waves are used to determine the dielectric properties of the soil.

In some embodiments, the control system comprises a user interface. The user interface allows the user to make changes to the functionality of the control system. For example, the user interface may allow the user of the irrigation water heating system to alter a threshold temperature stored in memory. In another example, the user interface allows the user to change the instructions generated by the controller in response to the input information it receives. The user interface may also allow the user to add and subtract inputs to the control system, thus enabling the user to select which sensors to use among a plurality of sensors for engaging the control system.

The user interface may be located on a remote terminal, which communicates with the controller over a network. Alternatively, the user interface may comprise a keypad operatively coupled to the controller and a display operatively coupled to the controller.

Referring to FIG. 5B, an illustrative graph indicating points at which the irrigation water heating system may be engaged and disengaged relative to air temperature is shown. FIG. 5B shows an exemplary illustration of the changes in air temperature over the course of a day in an area where agricultural frost damage is of concern. The irrigation water heating system may be engaged when the air temperature drops below about 34° F. at approximately midnight, as shown at intersection 518. Controller 502 may also examine air temperature data stored in a buffer in memory to determine whether the air temperature has been falling. If the air temperature has been falling over a predetermined period of time and the air temperature is below about 34° F., the controller generates an instruction to engage the irrigation water heating system.

The irrigation water heating system may be disengaged when the air temperature rises above about 35° F. at about approximately 7:30 AM, as shown at intersection 520. The air temperature data stored in a buffer in memory may also be used by the controller to determine whether the temperature has been rising. If the air temperature has been rising over a predetermined period of time and the air temperature is above about 35° F., the controller generates an instruction to disengage the irrigation water heating system.

Figure 5C:
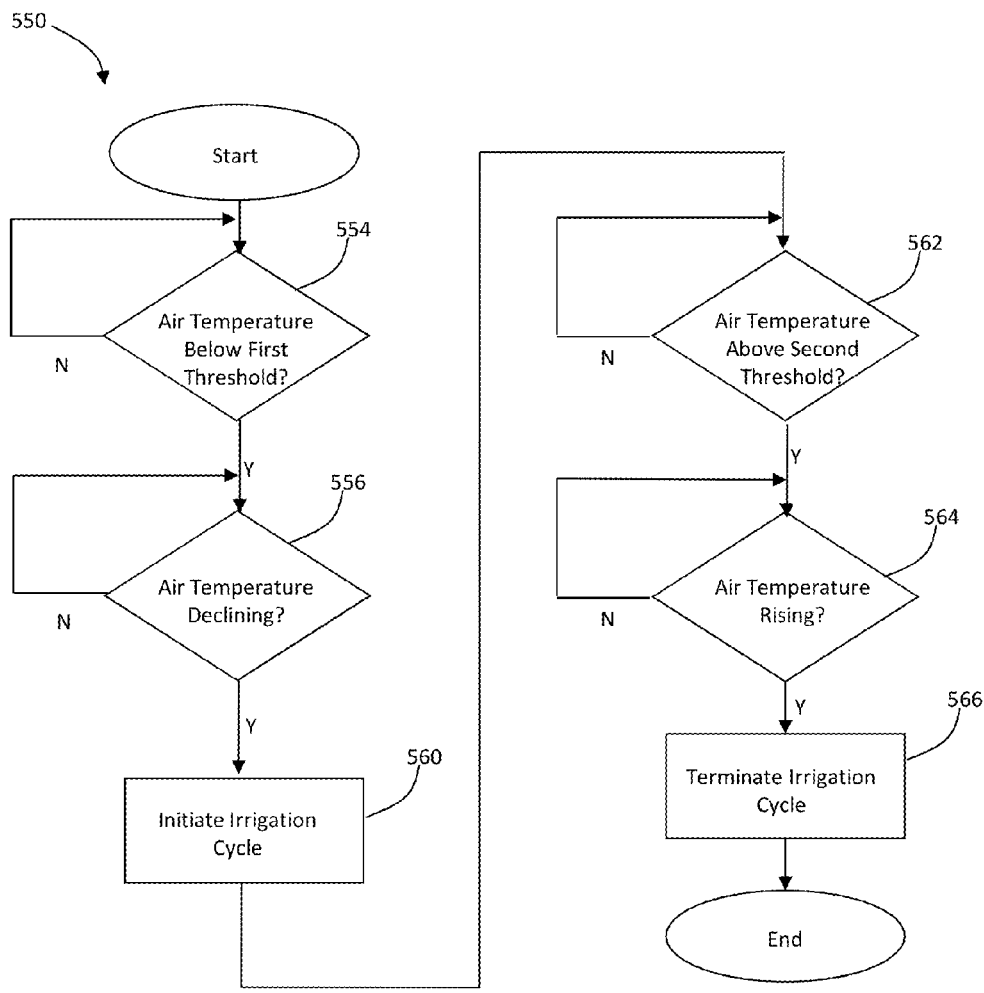
FIG. 5C shows an illustrative flow chart for the operation of the control system.

Referring to FIG. 5C, a method 550 for engaging and disengaging the water heating system is shown. The method begins at decision diamond 554, in which the control system compares the air temperature as measured by an air temperature sensor against a first threshold temperature. If the air temperature is lower than the first threshold temperature, the method proceeds to decision diamond 556, in which the control system determines whether the air temperature has been declining over a predetermined period of time. For example, the control system may determine that the air temperature has been declining if the temperature stored at time t in the buffer is lower than the temperature stored at time t-1, and the temperature stored at time t-1 is lower than the temperature stored at a time t-2, and so on through time t-n where n is the number of temperature readings stored in the buffer. Alternatively, n may be a subset of the temperature readings stored in the buffer corresponding to a predetermined time period.

If the air temperature has been declining, the method proceeds to block 560. In block 560, the valve 414 in the conduit 416 connecting the geothermal water source to the heat exchanger 422 is opened. The method proceeds to decision diamond 562, in which the control system compares the air temperature against a second threshold temperature. If the air temperature is greater than the second threshold temperature, the method proceeds to decision diamond 564 where the control system determines whether the air temperature has been rising over a predetermined period of time. For example, the control system may determine that the air temperature has been rising if the temperature stored at time t in the buffer is higher than the temperature stored at time t-1, and the temperature stored at time t-1 is higher than the temperature stored at a time t-2, and so on through time t-n. If the air temperature has been rising, the method proceeds to block 566. In block 566, valve 414 is closed to stop the flow of geothermal water through the heat exchanger.

Figure 6A:
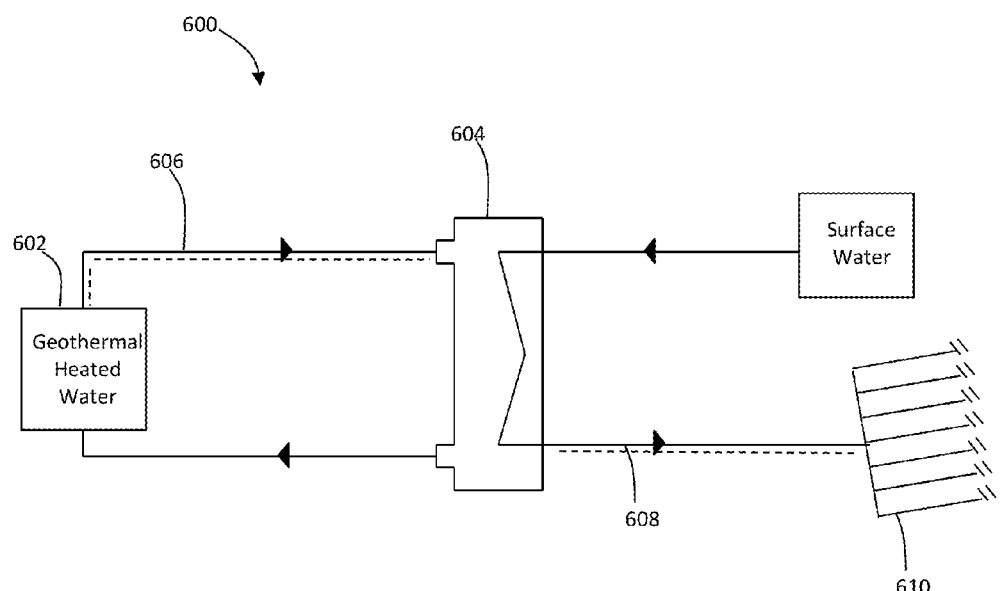
FIG. 6A shows an illustrative system for using of conduit insulation in an irrigation water heating system.

Referring to FIG. 6A there is shown an illustrative system 600 for using conduit insulation in an irrigation water heating system. In the illustrative system 600, the water traveling between the geothermal water source 602 and the heat exchanger 604 is insulated to minimize loss of heat from the geothermal water along the conduit 606. Conduit 608 may be insulated to minimize the loss of heat from surface water heated in the heat exchanger 604 as the surface water is delivered to irrigation manifold 610. The locations for conduit insulation in the irrigation water heating system are indicated by dotted lines along conduits 606 and 608. The insulated conduits may be prefabricated pipes containing insulating material such as fiberglass, or may be fabricated from a pipe surrounded by an insulating material such as polymer foam. Insulated conduits may also be pipes which are buried and insulated by the ground.

Figure 6B:
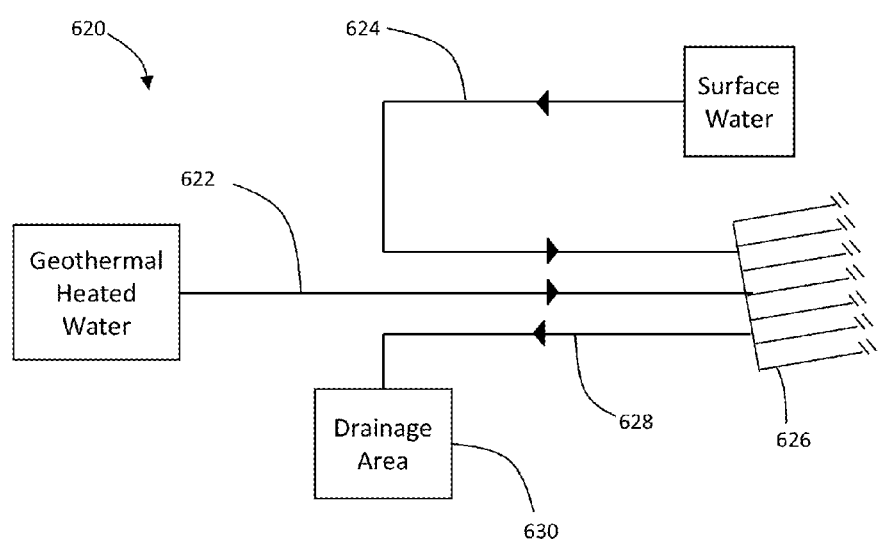
FIG. 6B shows an illustrative geothermal heated water system where geothermal water and surface water are applied directly to the row.

Referring to FIG. 6B there is shown an illustrative geothermal heated water system 620 where geothermal water and surface water are applied directly to the illustrative vines. In the illustrative system 620, the geothermal heated water 622 is applied directly to the illustrative vines. By way of example and not of limitation, the illustrative water temperature for the geothermal heated water may range from 85° F. to 105° F. In a narrower embodiment, the geothermal heated water may range from 90° F. to 100° F. In an even narrower embodiment, the geothermal heated water is approximately 90° F. The geothermal heated water 622 is then supplied via the irrigation manifold 626 to the crops. As described in further detail below, the geothermal heated water 622 is then applied, e.g. sprayed, to the surrounding crop area to create a heated water zone that prevents the crops from frost damage. In the illustrative embodiment, a drainage system collects the groundwater in conduit 628 and transfers the formerly heated geothermal water to a drainage area 630 that is distant from the crops. The crops are irrigated with the higher water quality surface water that is transferred using conduit 624.

Figure 7:
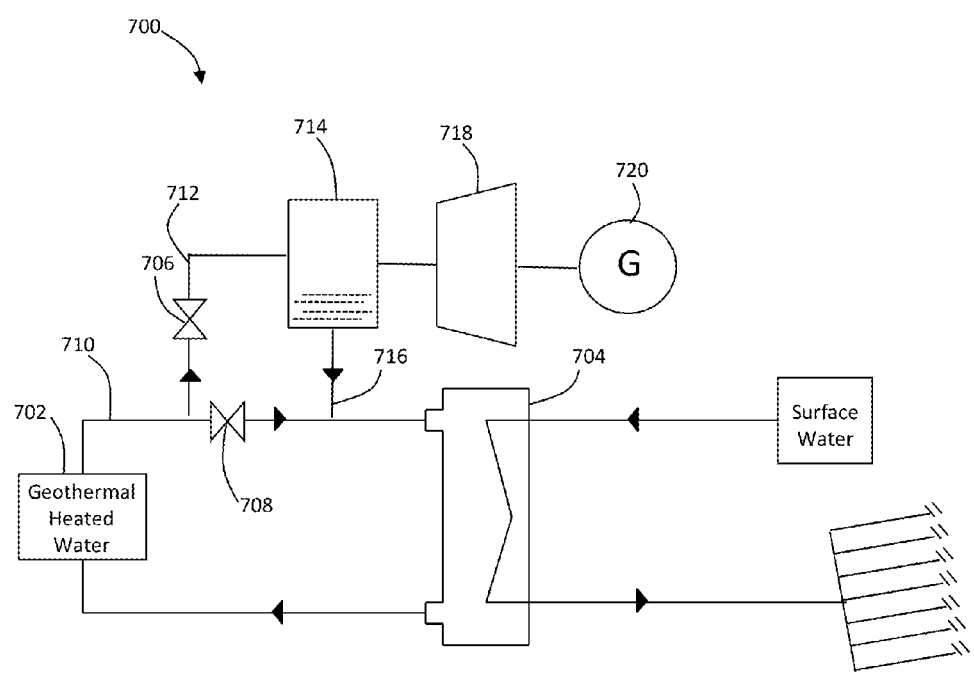
FIG. 7 shows an illustrative system for generating power using excess heat from the irrigation water heating system.

Referring to FIG. 7 there is shown an illustrative system 700 for generating power using excess heat from a geothermal heated fluid is shown. The geothermal heated fluid 702 may produce more heat than is necessary for heating surface water in heat exchanger 704. Excess heat may be produced periodically or it may always be available. Geothermal heat may be used to generate power whenever the irrigation water heating system is disengaged.

In one embodiment, valves 706 and 708 are used to control the flow of geothermal heated fluid from the geothermal water source 702. When power generation is initiated, valve 706 is open and valve 708 is closed. Geothermal heated fluid flowing through conduit 710 flows into conduit 712 and is channeled into separator 714, where the fluid is separated into steam and water. The water flows through conduit 716 to be delivered to the shell-side inlet of heat exchanger 704. The steam flows to turbine 718, which drives generator 720. When power generation is disengaged, valve 706 is closed and valve 708 is open. The geothermal heated fluid bypasses the power generation system and flows directly to heat exchanger 704.

Referring to FIGS. 8A and 8B, side and front elevations of an illustrative agricultural trellis are shown, respectively. The trellis may be used to train and support an agricultural plant, such as a grapevine. The trellis comprises a post 802 and may comprise one or more cross-arms 804, 806 and 808. The post and cross arms are generally comprised of wood, even though they may also be made from other materials such as bamboo or metal. The cross arms may be coupled to the post with attachment means such as nails or screws. The cross arms may have openings as shown at 810. The post 802 may also have openings as shown at 812. The openings in the post 812 and in the cross arms may be, for example, a hole drilled through the cross arm or the pole. The openings may receive wires as shown at 852-860 in FIG. 8B. The cross arms 804, 806 and 808 receive catch wires 854, 856 and 858, respectively. Each of the cross arms shown in FIG. 8A is shown with two openings to receive two catch wires. The opening 812 receives fruiting wire 860. An additional opening 812 in the trellis post may receive a net wire. The fruiting wire 860 is used to train the growth of the plant. For example, the fruiting cane of a grapevine may be trained onto the fruiting wire. One or more catch wires 854-858 may be used for additional support of the foliage and fruit of the grapevine. A net wire 852 supports a protective net as shown in FIGS. 9A-9B.

Referring to FIGS. 9A-9B, an illustrative trellis with integrated drip and spray irrigation systems and protective net is shown. FIG. 9A shows the trellis with the protective net retracted. In FIG. 9B, the protective net is deployed. Trellis 900 comprises post 902. A drip irrigation line 904 is coupled to post 902 near the base of the post. The drip irrigation line provides irrigation water to the ground surrounding the trellis.

In the illustrative embodiment, a spray irrigation line 906 is coupled to post 902. The drip irrigation line 904 and the spray irrigation line 906 are coupled to an irrigation channel of the irrigation manifold 230. Irrigation water is channeled to the top of trellis 900 by tubing 908 coupled to the spray irrigation line 906. A nozzle 910 is coupled to the terminus of the tubing. The nozzle delivers a spray 912 of heated irrigation water to the area surrounding the trellis. In this manner, plants may be protected from damage due to cold weather damage. A protective net 914 is supported by net wire 852. The protective net provides protection to the plant from the effects of cold weather. The protective net may comprise, for example, a fabric or plastic mesh. The protective net is unfurled to partially or fully cover the plant as shown at 914 in FIG. 9B. When not in use, the protective net may be rolled or otherwise formed into a more compact shape as shown at 914 in FIG. 9A. The protective net may be secured in a rolled form by a fastener, for example, a strap with a hook and loop fastener.

In the embodiment illustrated in FIGS. 9A and 9B, heated surface water is delivered through the nozzle 910 for frost prevention and protection. In the embodiments illustrated in FIGS. 13-19, heated surface water, heated groundwater, and geothermal water may be sprayed through the corresponding spray nozzle for frost prevention and protection. The embodiments in FIGS. 13-19 enable the direct use of groundwater and geothermal water because the protective covers, the drainage system, and optional protective curtain prevent the sprayed heated water from reaching the roots of the plants in the sprayed area.

Figure 10A:
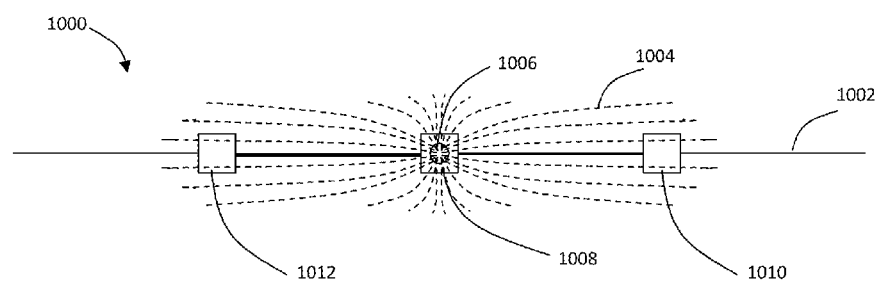
FIG. 10A shows an illustrative first spray pattern of a nozzle in a spray irrigation system.
Figure 10B:
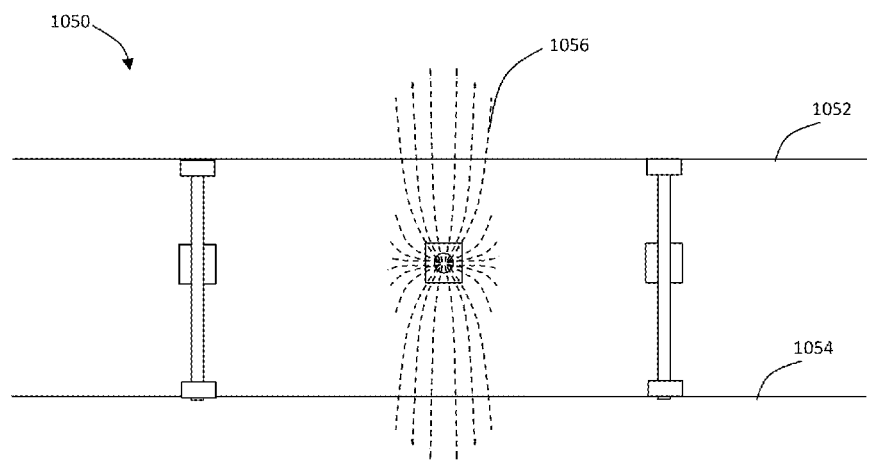
FIG. 10B shows an illustrative second spray pattern of a nozzle in a spray irrigation system.

Referring to FIGS. 10A and 10B, illustrative first and second spray patterns of a nozzle in a spray irrigation system are shown. A first spray pattern, shown in FIG. 10A, is oriented substantially along fruiting wire 1002. Heated irrigation water issues as a spray 1004 from nozzle 1006. The nozzle 1006 is affixed to trellis post 1008. Additional trellis posts are shown at 1010 and 1012. In the trellis system shown, a spray irrigation system is affixed to alternate trellis posts such that only one of every two trellis posts has a spray nozzle. In some embodiments, a nozzle is affixed to each trellis in a trellis system. It will be recognized that other distributions of spray irrigation systems among trellises in a trellis system are possible.

A plant trained along the fruiting wire will receive substantial coverage from a spray oriented as shown in FIG. 10A. In trellises having two fruiting wires 1052 and 1054, as shown in FIG. 10B, a spray pattern 1056 oriented to provide coverage to both fruiting wires may be desirable. The spray pattern shown in FIG. 10B may also be desirable to provide coverage to trellises having foliage and fruit supported by catch wires (e.g. 854) mounted via openings at the ends of a cross arm (e.g. 804).

Figure 11:
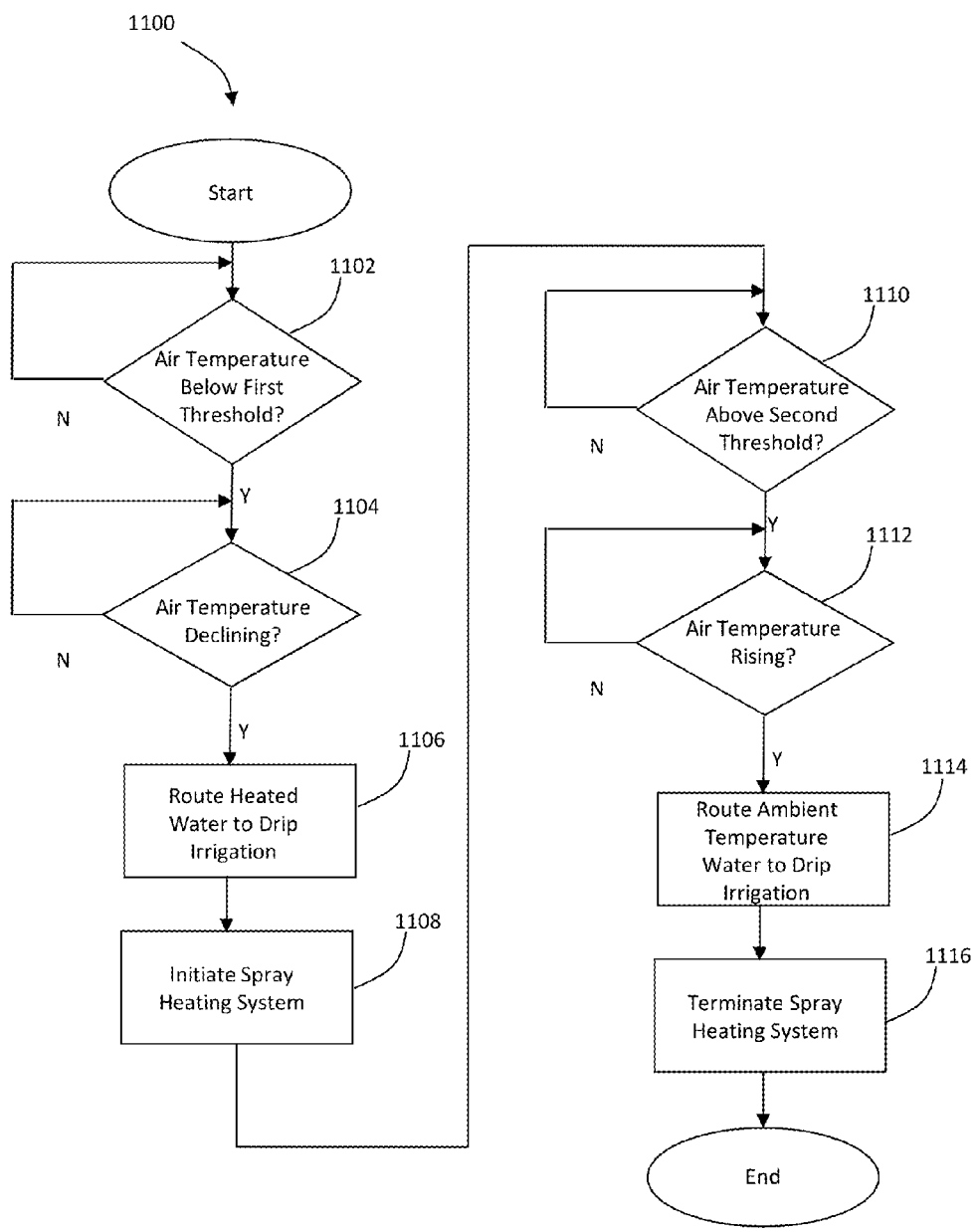
FIG. 11 shows an illustrative flow chart for the operation of the drip and spray irrigation systems.

Referring to FIG. 11, illustrative flow chart 1100 for the operation of the drip and spray irrigation systems is shown. The method begins at decision diamond 1102, in which the control system compares the air temperature as measured by an air temperature sensor against a first threshold temperature. If the air temperature is lower than the first threshold temperature, the method proceeds to decision diamond 1104, in which the control system determines whether the air temperature has been declining over a predetermined period of time.

In the illustrative flowchart, the method proceeds to block 1106 if the air temperature has been declining and if there is a need to irrigate the plants' root system. At block 1106, heated water is routed to the drip irrigation system. More generally, the heated water to the drip irrigation system is bypassed to avoid over irrigating the plant.

The method then proceeds to block 1108 where the spray heating system is initiated. The spray heating system is described herein in further detail. The irrigation system described herein is separate from the spray heating system, which is used to warm the air surrounding the plant.

At decision diamond 1110, the control system compares the air temperature against a second threshold temperature. If the air temperature is greater than the second threshold temperature, the method proceeds to decision diamond 1112 where the control system determines whether the air temperature has been rising over a predetermined period of time.

If the air temperature has been rising, the method proceeds to block 1114. In block 1114, the flow of heated water to the drip irrigation system is halted, and unheated (ambient temperature) irrigation water is routed to the drip irrigation system. The method then proceeds to block 1116, at which the flow of irrigation water to the spray irrigation system is terminated.

In some embodiments, additional sensor inputs or logic will be used to determine whether steps 1106 or 1108 or both will occur when the conditions presented in decision diamonds 1102 and 1104 occur. Similarly, additional sensor inputs or logic may be used to determine whether steps 1114 or 1116 or both will occur when the conditions presented in decision diamonds 1110 and 1112 occur.

For example, during some weather conditions, drip irrigation with heated water may be desirable and the heated spray is unnecessary. More generally, the heated spray would be used to avoid the frost damage, and there would more likely be little or no drip irrigation to avoid over irrigating the crops, e.g. vines.

Figure 12A:
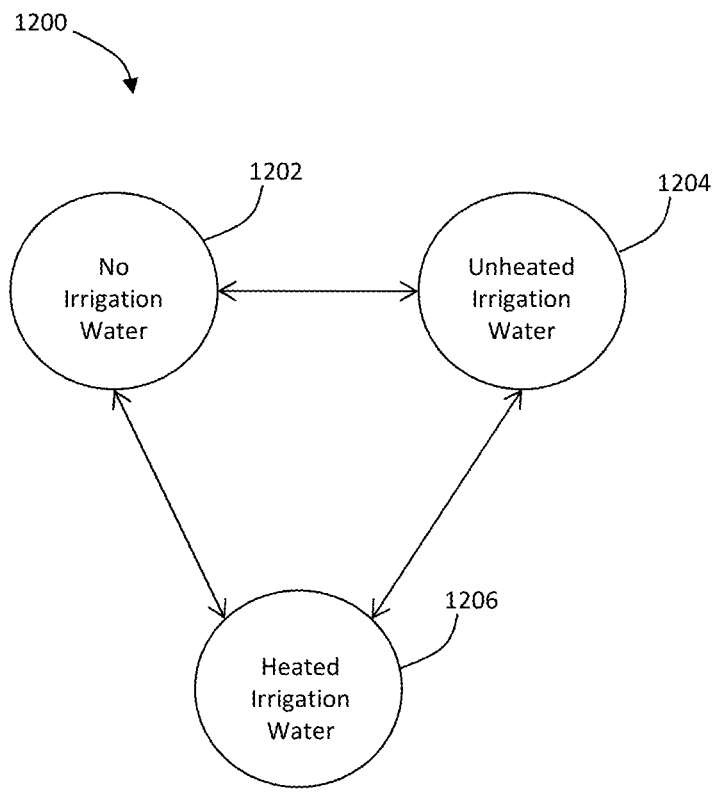
FIG. 12A shows an illustrative diagram for explaining the transitions between system states in the drip irrigation system.

Referring to FIG. 12A there is shown an illustrative state diagram 1200 for the operation of the drip irrigation system and the spray irrigation system. The illustrative controller described previously may be configured to enable the drip or spray irrigation system to provide no water, unheated water, and heated water.

At state 1202, no water is provided by the drip irrigation system. At state 1204, unheated water is provided by the drip irrigation system. At state 1206, heated irrigation water is provided by the drip irrigation system. The controller may enable transitions between any of states 1202, 1204, and 1206 as shown in state diagram 1200.

In an illustrative embodiment, the drip irrigation system may have an initial state 1202 of no irrigation water being provided. If irrigation is required, the controller may transition the drip irrigation system from state 1202 to 1204, to provide unheated irrigation water to the drip irrigation system. If the air temperature falls below a first threshold and the air temperature is declining, the controller may transition the drip irrigation system from state 1204 to state 1206, to provide heated irrigation water to the drip irrigation system. The controller is configured to open a valve 414 disposed between the geothermal heated water source and the heat exchanger to enable a transition between these states. If the air temperature subsequently rises above a second threshold condition and the air temperature is rising, the controller may transition the drip irrigation system from state 1206 to state 1204, closing valve 414. In some cases, the air temperature may be below a first threshold temperature and declining when the irrigation system is first initiated. In this case, the controller may transition the drip irrigation system from state 1202 to state 1206.

Figure 12B:
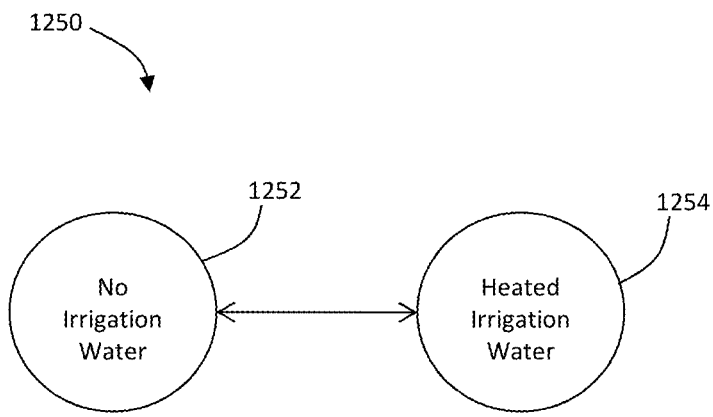
FIG. 12B shows an illustrative diagram for explaining the transitions between system states in the spray irrigation system.

Referring to FIG. 12B, illustrative state diagram 1250 for the operation of the spray irrigation system or spray system is shown. The controller of the control system may be configured to enable the spray system to provide no irrigation water and heated water. At state 1252, no irrigation water is provided by the spray irrigation system. At state 1254, heated irrigation water is provided by the drip irrigation system. The controller may enable transitions between states 1252 and 1254, as shown in state diagram 1250.

In an illustrative embodiment, the spray irrigation system may have an initial state 1252 of no irrigation water being provided. If the air temperature falls below a first threshold and the air temperature is declining, the controller may transition the drip irrigation system from state 1252 to state 1254, to provide heated irrigation water to the drip irrigation system. The controller is configured to open a valve 414 disposed between the geothermal heated water source and the heat exchanger to enable a transition between these states. If the air temperature subsequently rises above a second threshold condition and the air temperature is rising, the controller may transition the drip irrigation system from state 1254 to state 1252, closing valve 414.

Typically, when heated irrigation water is provided to the drip irrigation system, heated irrigation water will also be provided to the spray irrigation system. However, in some embodiments, the control system is configured such that the spray irrigation system may provide heated irrigation water while the drip irrigation system provides unheated irrigation water.

A system for providing drip and spray irrigation with heated water has been described. Drip and spray irrigation systems may be mounted to agricultural trellises to provide heated irrigation water at ground level and as a spray at an elevated level relative to the plant supported by the trellis.

Yet another embodiment is directed to a frost prevention and frost protection system. The illustrative embodiment provides a system for using heated water to prevent frost damage to irrigated crops, such as grapevines. In the illustrative embodiment, heated water is delivered through a heated spray system, thus increasing the ambient temperature near the irrigated crops and preventing frost damage. The crops are protected from excessive irrigation with the addition of protective covers and a drainage system.

The heated water can be heated surface water, surface water heated with a heat exchanger as described above in reference to FIGS. 2-12, geothermal water, and groundwater. When spraying groundwater and geothermal water for frost prevention/protection, the protective covers prevent the groundwater from reaching the roots of the crops, and thus prevent damage to the roots due to contaminants and pollutants in the groundwater. Common contaminants and pollutants in groundwater include $H_2S$, heavy metals, salts, nitrates, silica, and chlorinated solvents. Embodiments herein will be described in terms of spraying groundwater, but it is to be understood that any type of heated water or heated surface water may be used in place of groundwater, as the protective covers and drainage system protect the plants/crops from excessive irrigation.

Groundwater at a temperature of about 100° Fahrenheit can be used to spray the rows of crops in order to maintain plants, such as grapevines, at a temperature of about 35-45° Fahrenheit. Higher and lower groundwater temperatures may be used in order to maintain the plants at a target temperature range other than 35-45° Fahrenheit. For instance, a temperature higher than 100° Fahrenheit may be used in colder environments to maintain the 35-45° Fahrenheit temperature range; a temperature higher than 100° Fahrenheit may be used if the target water temperature is higher than about 35-45° Fahrenheit; a temperature lower than 100° Fahrenheit may be used in warmer environments, etc.

The crops can be sprayed with groundwater one row at a time. Alternative spray patterns may also be used in order to keep the plants at the target temperature range. For instance, every other row may be sprayed with the groundwater at the same time; every other plant within a row may be sprayed at the same time, etc.

Figure 13A:
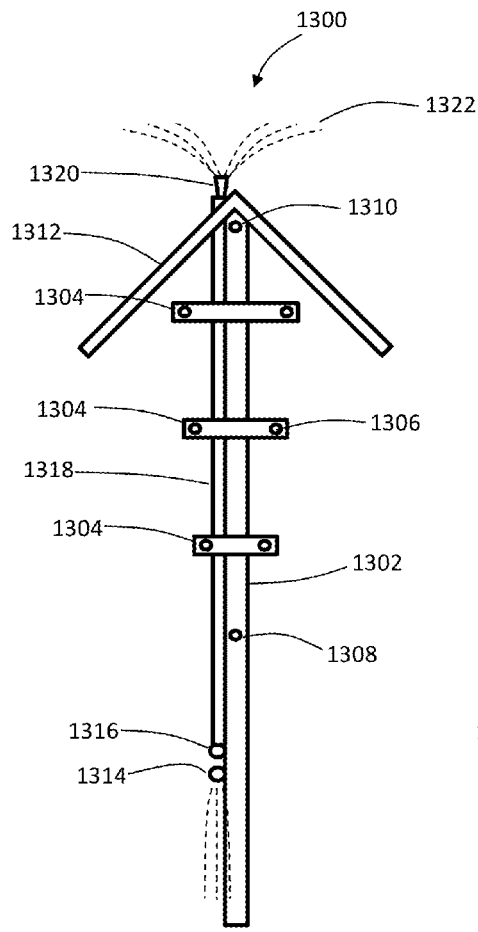
FIGS. 13A and 13B illustrate a front view and a side view of a trellis structure in accordance with a heated spray system embodiment for frost protection, the structure includes a protective cover for preventing the heated water from reaching the roots of the crops.
Figure 13B:
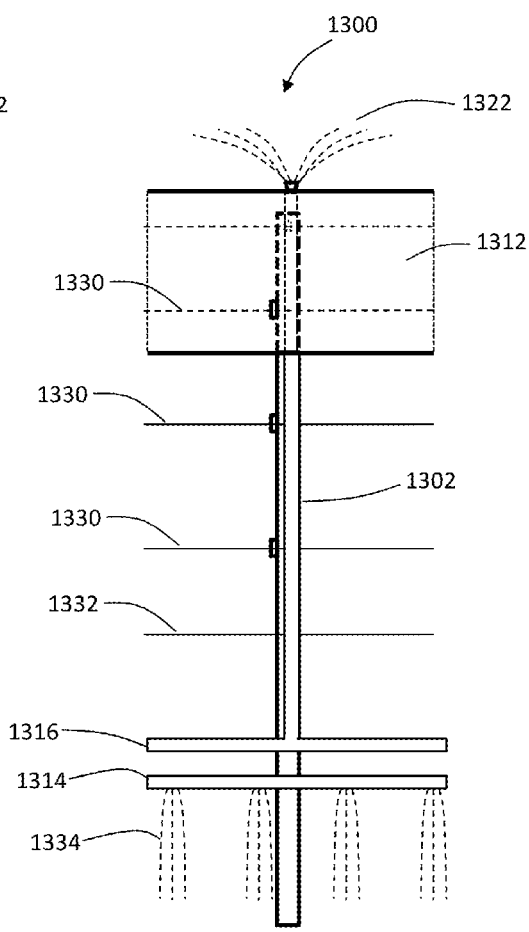

FIG. 13A illustrates a front view of an agricultural trellis in accordance with an embodiment. FIG. 13B illustrates a side view of trellis 1300. The trellis 1300 is comprised of a post 1302 with one or more cross-arms 1304. The post 1302 and cross-arms 1304 may include openings for receiving catch wires and fruiting wires. For example, cross-arm openings 1306 receive catch wires 1330, and lower post opening 1308 receives a fruiting wire 1332. The lower post opening 1308 may also receive a fastener for securing a lower protective cover as illustrated in FIG. 14. Upper post opening 1310 may receive a fastener for securing protective cover 1312. The protective cover 1312 may also be fastened to post 1302 using bolts, screws, nails, or some other fastener. The trellises presented and described herein are for illustrative purposes, as alternative trellises may be used with the embodiments described herein.

A drip irrigation line 1314 is coupled to post 1302 near the base of the post 1302. The drip irrigation line 1314 provides irrigation water, such as surface water 1334, to the ground surrounding the trellis 1300. A heated spray line 1316, coupled to post 1302, carries groundwater (or other heated water) sprayed from nozzle 1320 at the top of the trellis 1300. The drip irrigation line 1314 and the heated spray line 1316 are coupled to one or more irrigation channels as disclosed above. Alternatively, the drip irrigation line 1314 and the heated spray line 1316 may be coupled to an irrigation channel as is known in the art.

The drip irrigation line 1314 and the heated spray line 1316 need not be coupled to the same irrigation channel or the same irrigation system. For example, the drip irrigation line 1314 may be coupled to an irrigation channel as described above in reference to FIGS. 2-12. The heated spray line 1316 may be coupled to a different irrigation channel as described in further detail in reference to FIG. 15B. Finally, heated spray line 1316 may be engaged using sensors and a controller as described above. For example, if the air temperature drops below a first threshold temperature, e.g. about 34° F., a controller may generate an instruction to open a valve to engage the heated spray system to spray groundwater to prevent frost damage.

In one embodiment, a sensor may be configured to determine an ambient temperature near one or more plants. Each plant may have a sensor associated with it, or a sensor may be associated with an area within the crops, or a single sensor may be used to determine the ambient temperature near the crops. The controller may be configured to engage a pump when the sensor indicates that the ambient temperature is near freezing (or some other minimum temperature). When using one or more sensors associated with one or more plants, the controller may engage different heated spray lines based on the sensor values. For instance, if the temperature at a first end of the row of crops is below a first threshold level, while the temperature at the opposite end is above the first threshold level, then only the heated spray lines in the vicinity of the first end of the row of crops may be engaged to deliver heated water.

The actual temperature that engages the heated spray system may be configurable by a user via a user interface as described above. It is also noted that the controller can engage the heated spray system based on input from a plurality of sensors, including a sensor for detecting the humidity of the air, a soil temperature sensor, a barometric pressure sensor, a soil moisture sensor, a wind velocity sensor, etc. The controller may be used to engage the heated spray system in order to maintain the crops or plants at a target temperature. Further details associated with the sensors and the controller were described above in reference to at least FIGS. 4 and 5A.

Groundwater is channeled to the top of trellis 1300 through tubing 1318 coupled to the heated spray line 1316. The nozzle 1320, coupled to the end of the tubing 1318, delivers a spray 1322 or mist of groundwater to the area surrounding the trellis 1300 and the area surrounding the plant being supported by the trellis. The nozzle 1320 need not be positioned at the top of the trellis 1300. Instead, the nozzle 1320 can also be positioned anywhere along the post 1302, or even along one of the cross-arms. The nozzle 1320 may also be oriented at different angles to spray the desired area and/or to yield the desired spray pattern.

Various types of covers may be used for the protective cover 1312. In particular, the protective cover 1312 is a gable cover. Other types of commonly used covers include gambrel covers, shed covers, mansard covers, pyramid covers, domical covers, conical covers, saltbox covers, bonnet cover, or a combination of these types of covers. In one embodiment, the cover may be a roof, a shelter, or an alternative structure that shelters the plant and the soil near the plant from excessive irrigation.

The protective cover may be a collapsible or folding cover that opens during the spraying of the groundwater, and which closes (or retracts) after the groundwater has been sprayed. Alternatively, the collapsible cover may be left open at all times, and closed during windy conditions or other hazardous conditions.

The protective cover dimensions may be varied depending on a number of factors, such as the type of plants, the size of the plants, light conditions, weather conditions, crop arrangement, spacing between rows of plants, etc. The dimensions of the cover include at least the slope of the cover, the width of the cover, the length of the cover, and the height of the cover.

Figure 14A:
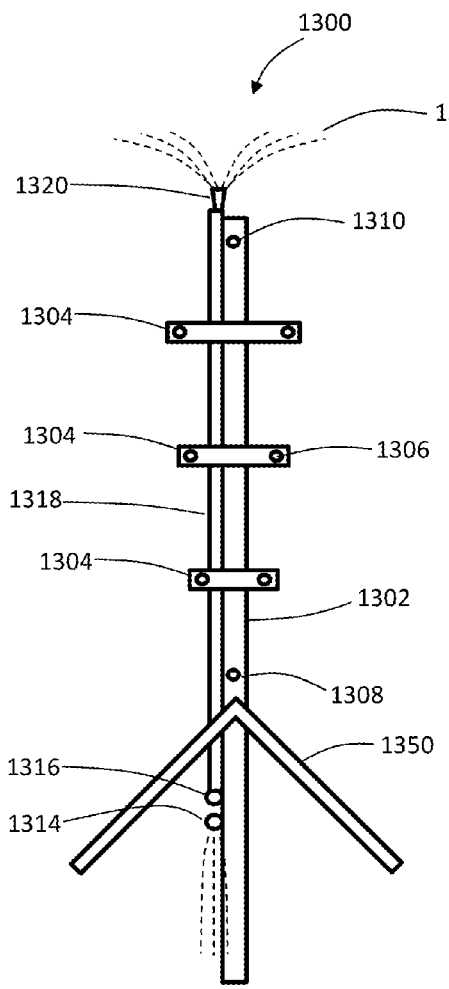
FIGS. 14A and 14B illustrate a front view and a side view of a trellis structure in accordance with an embodiment, the structure including a protective cover positioned below the fruiting wire of the trellis.
Figure 14B:
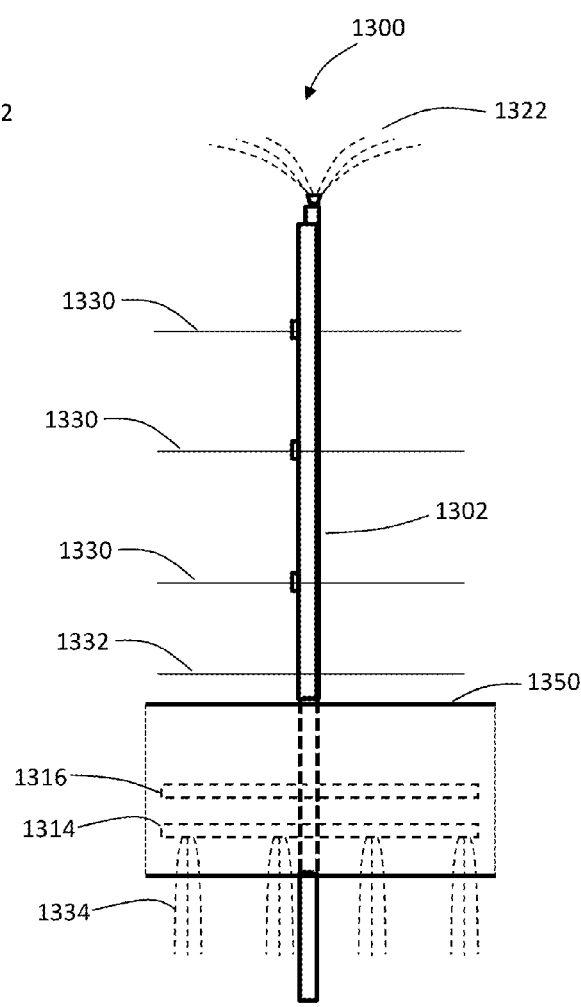

FIG. 14A illustrates an alternative assembly of a protective cover 1350 for trellis 1300, such that the protective cover 1350 is positioned below cross-arms 1306 but above the drip irrigation line 1314. The protective cover 1350 may also be positioned below the bottom of the vine, below the fruiting wire 1332, below the foliage, at a plant trunk level, at a plant stem level or anywhere along the post 1302 as long as the cover does not damage or obstruct the growth and sunlight received by the plant supported by the trellis. FIG. 14B illustrates a side view of the trellis 1300 from FIG. 14A.

In the illustrative embodiment of FIG. 14B, the nozzle 1320 may be spraying water having a temperature of 90° F. or less. Additionally, the drip irrigation line 1314 may also be irrigating with water at a temperature of 90° F. or less. As described herein, the sprayed water creates a heated zone that prevents frost damage. The drip irrigation line provides a means for irrigating the row crops. The protective cover 1350 prevents the crops from being excessively irrigated, especially when the protective cover 1350 is combined with impervious channel 1508 (shown in FIG. 15A) described in further detail below.

Specifically, the protective cover prevents the sprayed groundwater from falling on the ground near the plant and its roots to prevent excessively irrigating the crops. The protective cover can be positioned and sized such that the groundwater cover runoff falls on a drainage system, rather than falling on the ground where the plants are planted. The lower position of the protective cover provides the additional advantage of providing more localized protection, such that the groundwater spray or mist does not reach the ground because the protective cover is closer to the ground. The lower protective cover also does not interfere with the sunlight received by the plants and with the physical grow of the plants.

If crops are arranged in rows, where each plant within a row is supported by a trellis, each trellis may include a protective cover. A protective cover may also be installed on every other trellis, or installed on only a select number of trellises. The protective cover can be sized and shaped to have a length, width, and other dimensions, that permit the single protective cover to protect one or more plants. If a single trellis supports one or more plants, then the trellis may include a protective cover that is sized and shaped to provide the appropriate coverage to the one or more plants supported by the trellis. Finally, a single protective cover may be installed to protect an entire row of plants, with the single protective cover spanning the length of the row of plants.

The protective cover may be made out of transparent plastic. Alternatively, the protective cover may be made out of wood, asphalt, fiberglass, clay, metal, among other materials. The cover may consist of a single flat surface, it may be tiled, or it may consist of cover shingles.

Figure 15A:
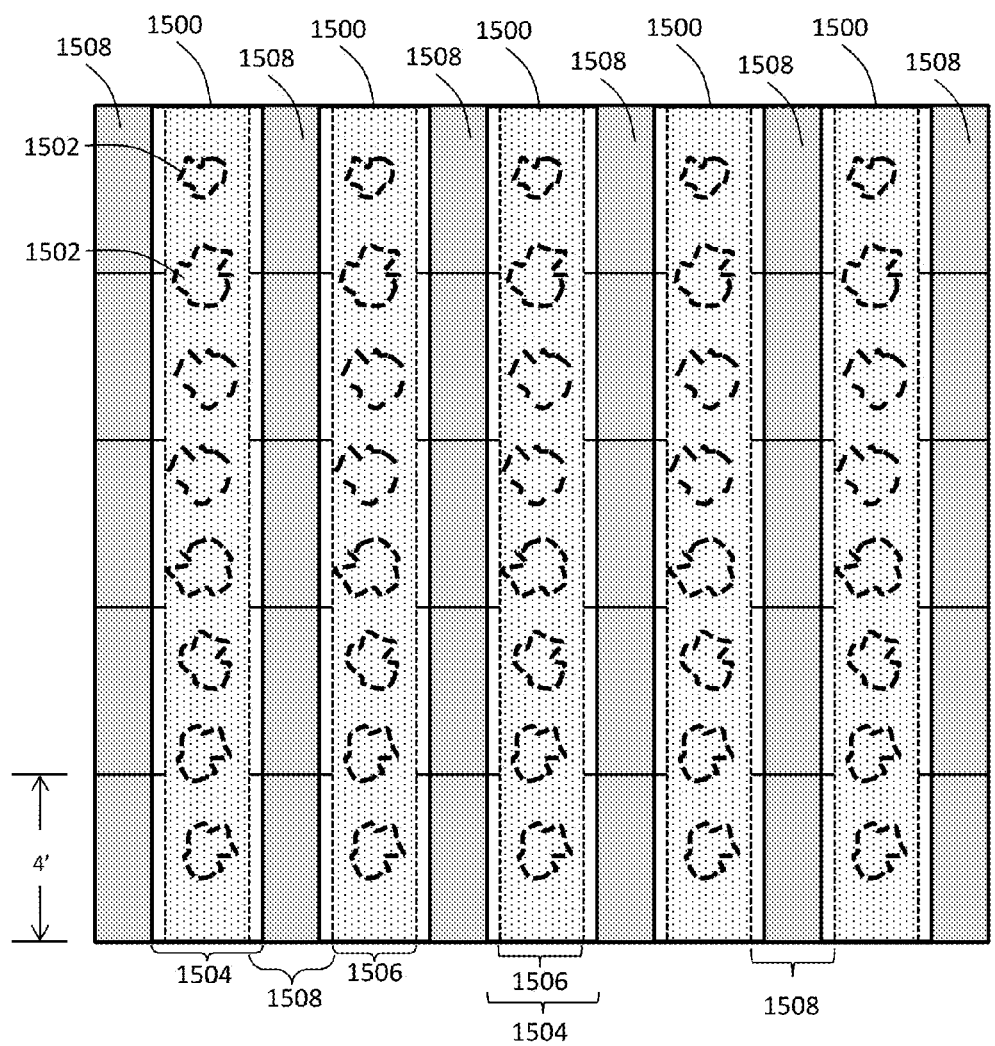
FIG. 15A illustrates a top view of a row of crops in accordance with an embodiment, including the protective covers and drainage system.

FIG. 15A illustrates a top view of five rows 1500 of plants 1502 in accordance with an embodiment. Each row 1500 of plants includes a cover 1504 covering exposed soil 1506 beneath each plant 1502. As noted above, the cover may be a single cover that spans the length of the row of crops, a cover may be installed over each trellis, or one or more covers may be installed over one or more trellises along each row. The cover 1504 is wider than the exposed soil 1506 beneath each plant, preventing the sprayed groundwater from falling on the exposed soil 1506.

The drainage system consists of a plurality of channels 1508 installed between each row 1500 of plants 1502. The drainage system diverts water away from the crops. The drainage system may consist of an impervious channel that collects the water runoff from the protective covers and the sprayed groundwater. The channel may be composed of a rolled plastic material that occupies the drainage channels (shown in FIGS. 16A and 16B), plastic sheets, metal sheets, or some other suitable impervious material. In one embodiment, a pipe may be cut in half lengthwise, with the resulting half pipe used as a channel for the drainage system. If using a metal channel for the drainage system, the protective cover, or the gutters of the protective cover, the use of fungicide, algaecide, and herbicide may be used to avoid mold on metal pieces.

In one embodiment, the channel of the drainage system may consist of trench or ditch dug between the rows of plants. The trench or ditch may then be lined with a plastic liner to make the trench or ditch impervious to the collected water. The plastic liner may be a plastic sheet. Alternatively, the liner may consist of a hard plastic liner. For example, the liner may be the flexible, plastic, thermoformed ditch liner made by SMARTDITCH. Any other suitable impervious ditch liner may also be used for the drainage system described herein.

The channels of the drainage system 1508 may be formed, installed, and/or positioned in various ways. In one embodiment, at least a portion of the channels can be positioned and aligned to be underneath the covers 1504, as further described in reference to FIG. 16.

In one embodiment, the covers 1504 may include a gutter diverting water to the channels 1508 between the rows of plants. The gutter may also divert the water runoff away from the plants through one or more conduits, without having to install or build channels between the rows of plants.

Figure 15B:
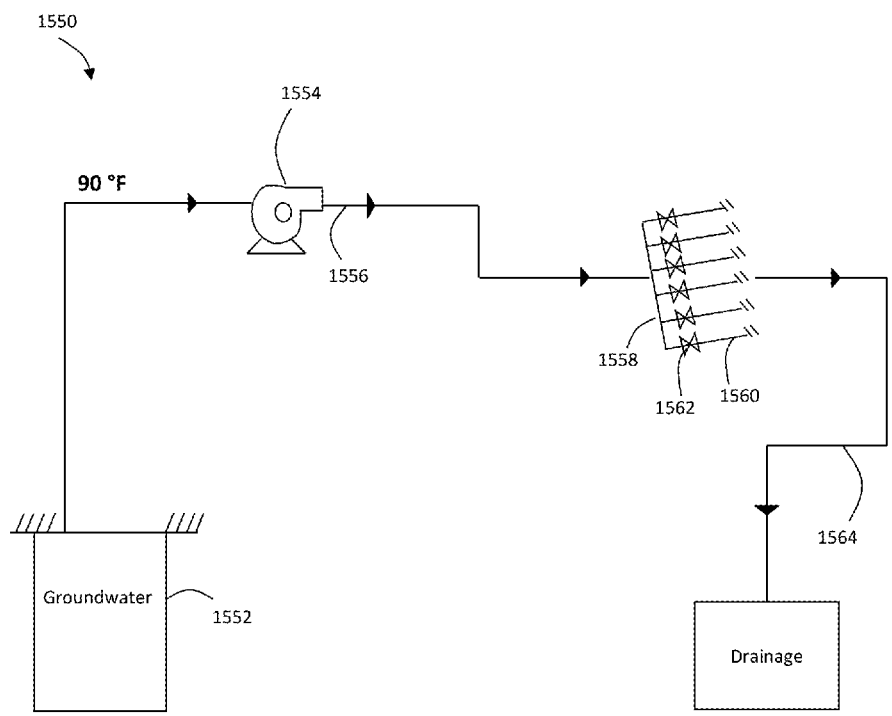
FIG. 15B illustrates a diagram of a heated spray system for frost protection and prevention in accordance with an embodiment.

FIG. 15B illustrates a diagram of a heated spray system 1550 that can be used to spray groundwater for frost protection/prevention of the rows of plants 1502 from FIG. 15A. Groundwater is pumped from a groundwater source 1552 with a pump 1554 or with some alternative device or mechanism. The groundwater source 1552 may be a well, a hot spring, a geothermal water source, and other such sources containing groundwater and/or geothermal water. The groundwater flows through conduit 1556 into an irrigation manifold 1558 comprising a set of irrigation channels 1560 for the heated spray system. The irrigation channels 1560 can have valves 1562 to control delivery of the heated groundwater to the irrigation channels 1560. The irrigation channels of the heated spray system terminate in an outlet, such as a sprinkler nozzle (not shown) or mister nozzle (not shown), that disperses the groundwater as mist or spray. The sprinklers or misters may be at ground level or elevated above ground level by a stand, trellis, or other such device that elevates the mister or sprinkler.

The groundwater is drained from the irrigated crops via one or more channels, which are connected to at least one drain conduit 1564. The water may be drained to a groundwater storage, to another location, or back into the groundwater source 1552.

As noted above, in one embodiment, surface water may be heated with a heat exchanger, as described in reference to at least FIGS. 1-12, and the heated surface water may be sprayed on the vicinity of the irrigated crops to prevent frost damage. The protective covers and the drainage system may be used to prevent excessive irrigation of the crops. The surface water may be heated with geothermal water or with groundwater at approximately 90° F.

In one embodiment, the heated spray system 1550 may include a sensor (not shown) configured to determine an ambient temperature near one or more plants or vines. A control system, as described in reference to at least FIGS. 4 and 5, may be used to control the flow of water of the heated spray system based on the information from a plurality of sensors. The controller may receive input from the ambient temperature sensor (air temperature sensor), and if the temperature is less than a first temperature threshold, then the controller may engage the heated spray system. The controller may engage the conduits that feed different heated spray lines based on the ambient temperature input and based on other sensors. For example, if the temperature is less than a first threshold, then the controller may engage a first set of heated spray lines, if the temperature is less than a second threshold, the controller may engage a second set of heated spray lines, etc.

Figure 16A:
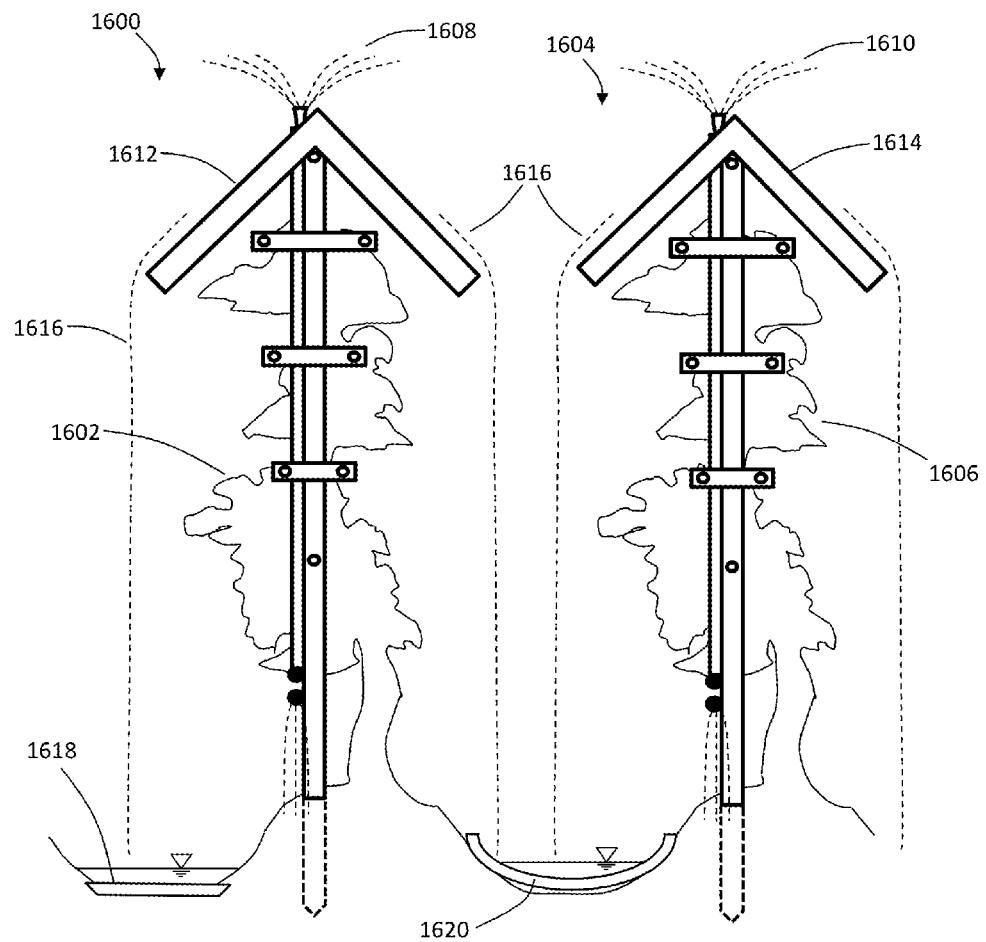
FIG. 16A illustrates a front view of two rows of plants, with the trellis structure including a protective cover for allowing the water runoff from the cover to fall and be drained with a drainage system between the rows of plants.

FIG. 16A illustrates a front view of a first row of plants and a second row of plants, as arranged in FIG. 15A. The first row of plants includes a first trellis 1600 supporting a first plant 1602, and the second row of plants includes a second trellis 1604 supporting a second plant 1606. The structure of the first trellis 1600 and the second trellis 1604 is similar to trellis 1300 from FIG. 13. In particular, FIG. 16A illustrates groundwater being sprayed from the heated spray lines fastened to the posts of the trellises 1600 and 1604, with the drainage channels and the protective covers aligned and arranged such that the groundwater cover runoff falls on the drainage channels.

A first spray 1608 (or mist) of groundwater is sprayed from a first groundwater spray line of the first trellis 1600 and a second spray 1610 (or mist) of groundwater is sprayed from a second groundwater spray line of the second trellis 1604. The groundwater cover runoff 1616 falls on the drainage channels 1618 and 1620 positioned between the rows of plants. The drainage channels 1618 and 1620 are positioned such that at least a portion of the drainage channels 1618 and 1620 is below the covers 1612 and 1614.

The first drainage channel 1618 is a substantially V shaped, shallow channel. In contrast, the second drainage channel 1620 is a substantially U shaped and deeper channel. The two different drainage channels are presented for illustration purposes, as the same type of drainage channel may be used between all rows of plants. However, one or more different types of drainage channels may also be used between rows of plants depending on the plants being grown, the size of the plants, the spacing between the various rows, the size of the trellises, the size of the covers, soil conditions, etc.

In FIG. 16A the drainage channels 1618 and 1620 are positioned below ground level (i.e. below the base of plants 1604 and 1606). However, the drainage channels may be installed and positioned at ground level or above ground level. The width, length, depth, shape, and type of drainage channel may be based, among various factors, on the ground conditions, the size of the plants, the amount of spacing between rows of plants, the type of plants, the amount of groundwater being sprayed to maintain a desired temperature range, the size and shape of the covers, the size and shape of the trellises, etc. In addition, the drainage channels may include side walls that extend closer to the trunk of the plants, thus sheltering a wider area. The side walls may be vertical, diagonal or curved.

Figure 16B:
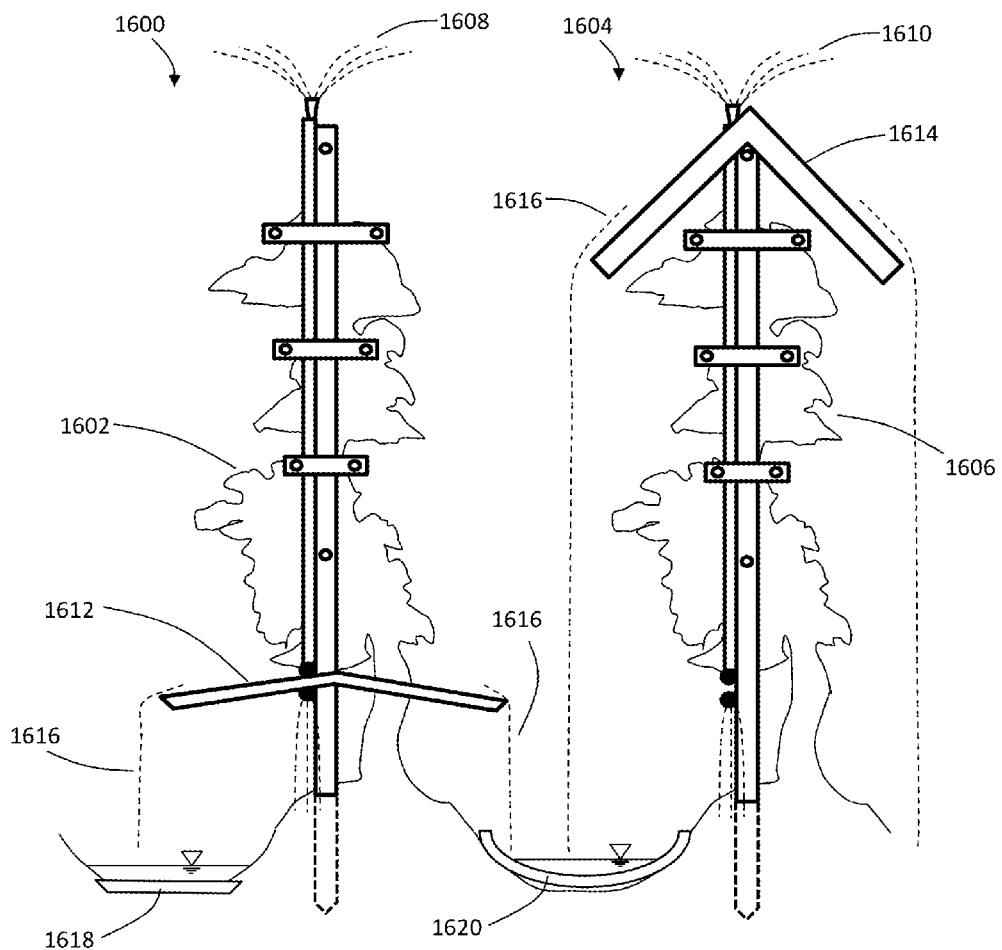
FIG. 16B illustrates a front view of two rows of plants, with the first row including protective covers below the fruiting wire and the second row including protective covers above the catch wires.

FIG. 16B illustrates the first trellis 1600 with the protective cover 1612 positioned below the brush line of the first plant 1602. The height, position, and type of protective cover can be varied within a single row of plants and/or between rows of plants as shown in FIG. 16B. As yet another example, rather than only using gable covers, one row of plants may use gable covers while a second row of plants may use shed covers. As evident from FIG. 16B, positioning the protective cover 1612 below the brush line of the first plant 1602 provides more localized protection to the ground around the first trellis 1602, while not obstructing with the growth of the plant or the amount of light received by the plant.

Figure 17A:
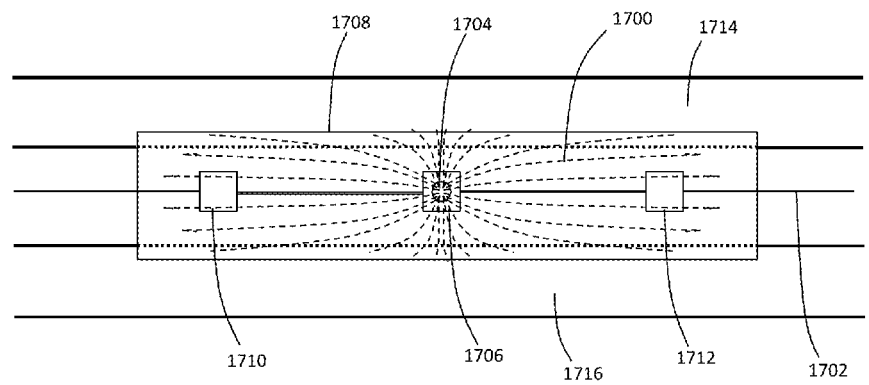
FIGS. 17A and 17B illustrate a top view of two possible spray patterns of heated water for frost protection and prevention in accordance with an embodiment.
Figure 17B:
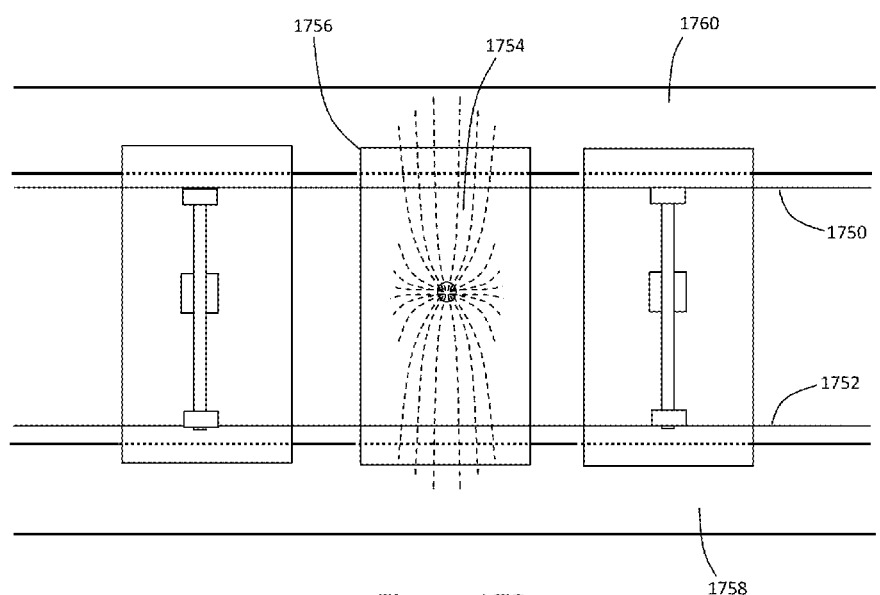

As discussed in reference to FIGS. 10A and 10B, and as further illustrated in FIGS. 17A and 17B, differing spray patterns may be used to spray groundwater (or other heated water) around the plants. For example, the spray pattern may be oriented substantially along the fruiting wire, i.e. oriented substantially along the row of plants. If the heated spray line is included in a select number of trellises in a row of plants, the spray pattern can be adjusted such that the spray pattern covers one or more plants. The spray pattern can thus be adjusted by changing at least the length, width, and shape of the spray pattern. If the spray pattern is a circular pattern, the pattern can be adjusted by changing the spray radius. It is also possible to include a rotating spray head instead of the spray nozzle 1320 (shown in FIG. 13A), with the rotating spray head spraying groundwater on a plurality of plants and even a plurality of rows. The height of the spray nozzle 1320 and the spray angle may be adjusted by changing the position and facing angle of the nozzle 1320.

FIG. 17A illustrates a first spray 1700 oriented substantially along fruiting wire 1702. The first spray 1700 is sprayed from nozzle 1704, which is affixed to trellis 1706. A single protective cover 1708 prevents the groundwater spray 1700 from reaching the roots of the plants supported by trellises 1706, 1710, and 1712. The protective cover 1708 may be fastened and secured to the middle trellis 1706, or it may be secured to all trellises 1706, 1710, and 1712. A first drainage channel 1714 and a second drainage channel 1716 are aligned parallel to the row of trellises. The groundwater cover runoff is diverted away from the plants through the drainage channels 1714 and 1716.

In the trellis system shown in FIG. 17A, a heated spray line is affixed to alternate trellis posts such that only one of every two trellis posts has a spray nozzle. Protective covers can be installed accordingly based on the arrangement of the heated spray system. It will be recognized that other distributions and arrangements of heated spray lines, among plants and rows of plants, and the corresponding protective covers are possible.

In trellises having two fruiting wires 1750 and 1752, as shown in FIG. 17B, a spray pattern 1754 oriented to provide coverage to both fruiting wires may be desirable. The spray pattern 1754 may also be desirable to provide coverage to trellises having foliage and fruit supported by catch wires mounted via openings at the ends of a cross arm. A protective cover 1756 protects the ground between the two fruiting wires 1750 and 1752 from the groundwater spray 1754. The groundwater cover runoff falls on the drainage channels 1760 and 1758, aligned parallel to the row of plants.

Figures 18A, 18B:
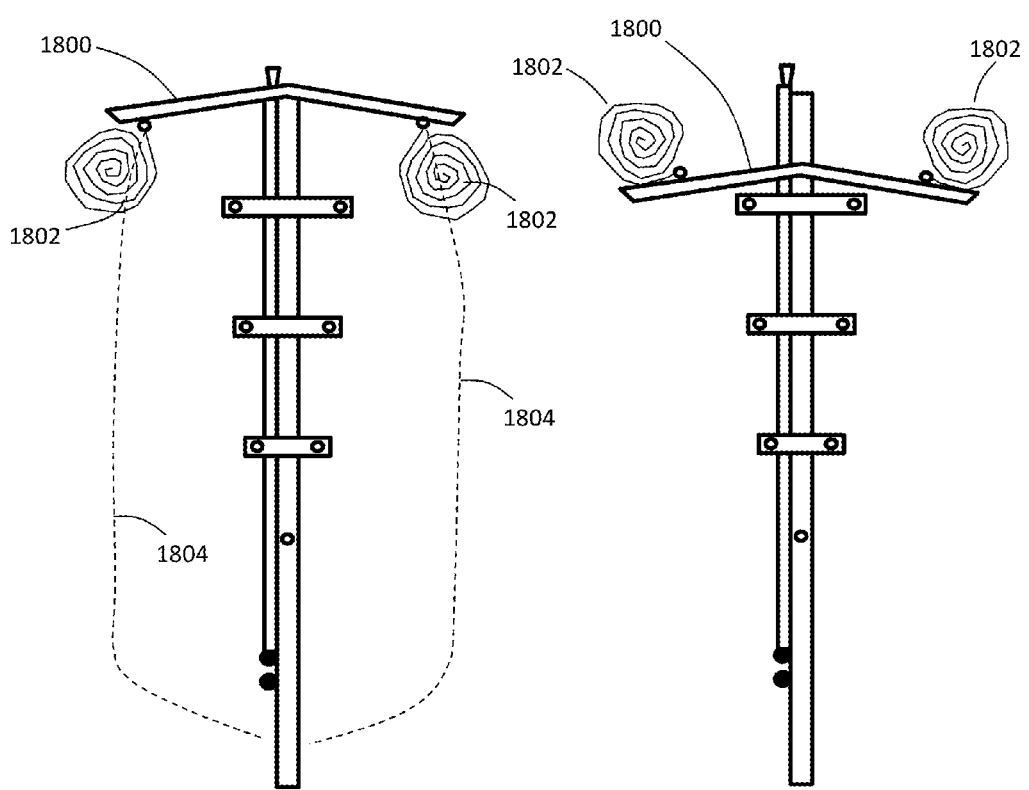
FIGS. 18A and 18B illustrate a front view of a trellis with a protective cover having a protective curtain attached to the protective cover.

FIGS. 18A and 18B illustrate alternative embodiments of protective covers including a protective curtain. The curtain may be made out of cloth, fabric, plastic or some other suitable material. The curtain may also consist of a net or a mesh made out of plastic, fabric, cloth, or some other suitable material. FIG. 18A illustrates a protective cover 1800 with a rolled up curtain 1802 attached to the underside of the cover 1800. The curtain may consist of a single sheet, or it may consist of two or more sheets that partially surround or fully surround the plant supported by the trellis. The curtain 1802 may expand from the cover 1800 to the ground as represented by the unrolled sheet 1804. In an alternative embodiment, the curtain 1802 may not expand the full length of the trellis. FIG. 18B illustrates the curtain 1802 attached on top of the cover 1800.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A heated spray system for frost protection, the system comprising:
    a trellis supporting a plant;
    a trellis protective cover fixedly coupled to the trellis, wherein the trellis protective cover covers a portion of the plant;
    a protective curtain shielding a portion of the plant and a portion of a ground area surrounding the trellis;
    a drip irrigation line coupled to the trellis, wherein the drip irrigation line provides drip irrigation to the ground area surrounding the trellis;
    a surface water that is provided to the drip irrigation line;
    a spray nozzle fixedly coupled to the trellis, wherein the spray nozzle is operatively coupled to a conduit receiving heated water from a heated water resource wherein the spray nozzle generates a mist or spray in a vicinity of the trellis;
    wherein the surface water includes fewer contaminants than the heated water; and
    wherein the drip irrigation line irrigates the plant supported by the trellis with the surface water and the trellis protective cover and the protective curtain prevent the plant from being irrigated by the heated mist or spray.

2. The heated spray system of claim 1 further comprising:
    a sensor determining an ambient temperature near the plant;
    a pump delivering the heated water to the spray nozzle using the conduit; and
    a control system engaging the pump when the sensor indicates the ambient temperature is near freezing.

3. The heated spray system of claim 1 further comprising a drainage system that collects the heated water emanating from the spray nozzle, the drainage system interfacing with soil near the plant and draining the heated water away from the plant.

4. The heated spray system of claim 1 wherein the heated water includes at least one of geothermal water and heated groundwater.

5. The heated spray system of claim 1 wherein the trellis cover being positioned at a top end of the trellis.

6. The heated spray system of claim 1 wherein the trellis cover being positioned at a plant trunk level.

7. The heated spray system of claim 1 wherein the trellis cover is composed of transparent and flexible material.

8. A heated spray system for frost protection, the system comprising:
    a trellis configured to support a plant;
    a trellis protective cover fixedly coupled to the trellis, wherein the trellis protective cover is configured to cover a portion of the plant;
    a protective curtain configured to shield a portion of the plant and a portion of a ground area surrounding the trellis;
    a drip irrigation line coupled to the trellis, wherein the drip irrigation line is configured to provide drip irrigation to the ground area surrounding the trellis;
    a surface water that is provided to the drip irrigation line;
    a spray nozzle fixedly coupled to the trellis, wherein the spray nozzle is operatively coupled to a conduit receiving heated water from a heated water resource, wherein the spray nozzle is configured to generate a spray in the vicinity of the trellis;
    a drainage system that is configured to collect the heated water emanating from the spray nozzle and configured to drain the heated water away from the plant;
    wherein the surface water contains fewer contaminants than the heated water; and
    wherein the drip irrigation line is configured to irrigate the plant supported by the trellis with the surface water and the trellis protective cover and the protective curtain prevent the plant from being irrigated by the heated mist or spray.

9. The heated spray system of claim 8 further comprising:
    a sensor configured to determine an ambient temperature near the plant;
    a first pump configured to deliver the heated water to the spray nozzle using a first conduit; and
    a control system configured to engage the first pump when the sensor indicates the ambient temperature is near freezing.

10. The heated spray system of claim 9 further comprising:
    an irrigation system configured to irrigate the plant, the irrigation system further comprising:
    an emitter configured to irrigate the plant with surface water from a second water resource; and
    a second pump configured to deliver the surface water to the emitter using a second conduit.

11. The heated spray system of claim 10 wherein the control system is configured to engage the second pump according to an irrigation cycle.

12. The heated spray system of claim 8 wherein the heated water includes at least geothermal water and heated groundwater.

13. The heated spray system of claim 8 wherein the trellis cover is configured to be positioned at a top end of the trellis.

14. The heated spray system of claim 8 wherein the trellis cover is configured to be positioned at a plant trunk level.

15. A method for frost protection, the method comprising:
    fixedly coupling a trellis protective cover to a trellis that supports a plant, wherein the trellis protective cover covers a portion of the plant;
    providing a protective curtain that shields a portion of the plant and a portion of a ground area surrounding the trellis;

coupling a drip irrigation line to the trellis, wherein the drip irrigation line provides drip irrigation to the ground area surrounding the trellis with a surface water;

determining an ambient temperature near a plant with a sensor;

engaging a first pump with a control system when the sensor indicates the ambient temperature near the plant is near freezing;

pumping heated water from a heated water resource to a spray nozzle, wherein the heated water is pumped along a first conduit and the spray nozzle is positioned near the plant;

generating a heated spray with the spray nozzle near the plant and providing the plant with frost protection;

collecting the spray from the spray nozzle with a drainage system that drains the collected spray water away from the plant; and irrigating the plant supported by the trellis with the drip irrigation line providing the surface water, wherein the trellis protective cover and the protective curtain prevent the plant from being irrigated by the heated spray, in which the surface water includes fewer contaminants than the heated water.

16. The method for frost protection of claim 15 further comprising covering the plant with a trellis cover configured to cover a portion of the plant.

17. The method for frost prevention of claim 15 wherein the trellis cover is positioned at one of a top end of a trellis and at a plant trunk level.

18. The method for frost prevention of claim 15 further comprising:
pumping surface water from a second water resource along a second conduit to an emitter that is positioned near the plant; and
irrigating the plant with the surface water delivered through the emitter.

19. The method for frost prevention of claim 18 further comprising irrigating the plant according to an irrigation cycle.

20. The method for frost prevention of claim 15 wherein the heated water includes at least one of geothermal water and heated groundwater.

* * * * *